US012623610B2

(12) United States Patent  
Kuschmeader et al.

(10) Patent No.: US 12,623,610 B2  
(45) Date of Patent: May 12, 2026

(54) CAR TOP EQUIPMENT RACK

(71) Applicant: Kuat Innovations LLC, Springfield, MO (US)

(72) Inventors: Luke Kuschmeader, Springfield, MO (US); Jordan Bowles, Springfield, MO (US); Mike Buis, Springfield, MO (US); Aaron Houston, Springfield, MO (US); Joshua Schwartz, Springfield, MO (US)

(73) Assignee: Kuat Innovations LLC, Springfield, MO (US)

( * ) Notice: Subject to any disclaimer, the term of this patent is extended or adjusted under 35 U.S.C. 154(b) by 464 days.

(21) Appl. No.: 17/521,212

(22) Filed: Nov. 8, 2021

(65) Prior Publication Data

US 2022/0055544 A1 Feb. 24, 2022

Related U.S. Application Data

(63) Continuation of application No. 16/255,321, filed on Jan. 23, 2019, now abandoned.

(Continued)

(51) Int. Cl.
| | |
|---|---|
| *B60R 9/08* | (2006.01) |
| *B60R 9/048* | (2006.01) |
| *B60R 9/12* | (2006.01) |

(52) U.S. Cl.  
CPC ................ *B60R 9/08* (2013.01); *B60R 9/048* (2013.01)

(58) Field of Classification Search  
CPC .............. B60R 9/08; B60R 9/12; B60R 9/048  
See application file for complete search history.

(56) References Cited

U.S. PATENT DOCUMENTS

| 1,233,576 A | * | 7/1917 | Higgins | ................ | E05B 69/006 |
| | | | | | 211/8 |
| 2,122,783 A | * | 7/1938 | Suter | ........................ | A45D 6/18 |
| | | | | | 132/244 |

(Continued)

FOREIGN PATENT DOCUMENTS

CN 205971100 U * 2/2017

OTHER PUBLICATIONS

CN 205971100 U by Chen, S; Sledge Frame For Automobile, Has Fixing Splint That Is Fixed To Roof Whose Top Surface Is Provided With Chute, And Sliding Clamping Plate Whose One End Is Installed Far Away From Hinge Joint Of Movable Lock Catch; Feb. 22, 2017 (Year: 2017).*

(Continued)

*Primary Examiner* — Nathan J Newhouse  
*Assistant Examiner* — Lester L Vanterpool  
(74) *Attorney, Agent, or Firm* — James H. Jeffries; Kutak Rock LLP

(57) ABSTRACT

An equipment rack for use with a vehicle is described having a sliding member translatably attached to a lower cross member of the rack. The sliding member translates outwardly from the rack to a loading and unloading position. In the loading and unloading position, sports equipment may be placed on or removed from the sliding member. When the sports equipment has been loaded the sliding member may be translated back toward the rack into a stowed position. In the stowed position an upper cross member may be clamped to the lower cross member to secure the sports equipment on the rack.

1 Claim, 34 Drawing Sheets

Related U.S. Application Data

(60) Provisional application No. 62/620,870, filed on Jan. 23, 2018, provisional application No. 62/645,881, filed on Mar. 21, 2018.

(56) References Cited

U.S. PATENT DOCUMENTS

| | | | | |
|---|---|---|---|---|
| 2,999,378 | A * | 9/1961 | Blair | A63C 11/006 |
| | | | | 280/814 |
| 3,242,704 | A * | 3/1966 | Barreca | A63C 11/007 |
| | | | | 211/70.5 |
| 3,601,294 | A * | 8/1971 | Gjesdahl | B60R 9/12 |
| | | | | 224/315 |
| 3,719,297 | A * | 3/1973 | Nowicki | B60R 9/12 |
| | | | | 224/310 |
| 3,848,785 | A * | 11/1974 | Bott | B60R 9/12 |
| | | | | 224/323 |
| 3,879,813 | A * | 4/1975 | Shadwell | A61B 17/282 |
| | | | | 24/459 |
| 3,999,409 | A * | 12/1976 | Bell | A63C 11/006 |
| | | | | 70/58 |
| 4,226,351 | A * | 10/1980 | Biermann | B60R 9/12 |
| | | | | 224/325 |
| 4,261,496 | A * | 4/1981 | Mareydt | B60R 9/12 |
| | | | | 224/315 |
| 4,312,467 | A * | 1/1982 | Kulwin | B60R 9/12 |
| | | | | 224/323 |
| 4,456,158 | A * | 6/1984 | Wertz | B60R 9/12 |
| | | | | 224/323 |
| 4,720,031 | A * | 1/1988 | Zimmerman | B60R 9/12 |
| | | | | 224/323 |
| 4,735,350 | A * | 4/1988 | Kamaya | B60R 9/048 |
| | | | | 224/323 |
| 4,817,838 | A * | 4/1989 | Kamaya | B60R 9/045 |
| | | | | 224/323 |
| D300,914 | S * | 5/1989 | Arvidsson | 224/323 |
| 4,867,362 | A * | 9/1989 | Finnegan | B60R 9/12 |
| | | | | 280/727 |
| 4,940,175 | A * | 7/1990 | Tittel | B60R 9/12 |
| | | | | 224/321 |
| 5,054,673 | A * | 10/1991 | Dixon | B60R 9/12 |
| | | | | 224/325 |
| 5,115,955 | A * | 5/1992 | Dallaire | B60R 9/12 |
| | | | | 224/322 |
| 5,119,980 | A * | 6/1992 | Grim | B60R 9/12 |
| | | | | 292/85 |
| 5,423,466 | A | 6/1995 | Moon | |
| 5,454,499 | A | 10/1995 | Gibbs | |
| 5,456,397 | A * | 10/1995 | Pedrini | B60R 9/12 |
| | | | | 224/316 |
| 5,490,621 | A * | 2/1996 | Dixon | B60R 9/12 |
| | | | | 248/316.1 |
| 5,657,913 | A * | 8/1997 | Cucheran | B60R 9/12 |
| | | | | 224/558 |
| 5,675,999 | A * | 10/1997 | Carlstrom | A63C 11/006 |
| | | | | 70/58 |
| D394,240 | S * | 5/1998 | Cucheran | B60R 9/12 |
| | | | | D12/412 |
| 5,988,470 | A * | 11/1999 | Siciliano | B60R 9/042 |
| | | | | 224/310 |
| 6,099,539 | A | 8/2000 | Howell | |
| 7,108,163 | B1 * | 9/2006 | Pedrini | B60R 9/12 |
| | | | | 224/323 |
| 7,377,283 | B2 | 5/2008 | Walker et al. | |
| 7,674,002 | B1 * | 3/2010 | Wang | F21V 23/0442 |
| | | | | 248/231.71 |
| D628,949 | S * | 12/2010 | Farber | D12/412 |
| D642,112 | S * | 7/2011 | Farber | D12/412 |
| 8,136,709 | B2 | 3/2012 | Jeli et al. | |
| D657,301 | S * | 4/2012 | Bogoslofski | B60R 9/055 |
| | | | | D12/406 |
| 8,297,570 | B2 | 10/2012 | Noyes | |
| 9,126,539 | B2 * | 9/2015 | Sautter | B60R 9/048 |
| 9,283,884 | B2 | 3/2016 | Sautter et al. | |
| 9,505,353 | B2 | 11/2016 | Bogoslofski et al. | |
| 9,649,988 | B2 | 5/2017 | Magnusson et al. | |
| 9,896,037 | B2 | 2/2018 | Magnusson et al. | |
| 9,987,997 | B2 * | 6/2018 | Rarey | B60R 9/048 |
| 2004/0131456 | A1 | 7/2004 | Henderson et al. | |
| 2007/0235489 | A1 * | 10/2007 | Jeli | B60R 9/12 |
| | | | | 224/558 |
| 2009/0314814 | A1 * | 12/2009 | Ross | B60R 9/08 |
| | | | | 224/315 |
| 2010/0170924 | A1 * | 7/2010 | Johnson | B62B 5/0003 |
| | | | | 224/484 |
| 2014/0143990 | A1 * | 5/2014 | Sautter | B60P 7/06 |
| | | | | 24/68 CD |
| 2017/0267187 | A1 | 9/2017 | Rarey | |

OTHER PUBLICATIONS

CN 205971100 U by Chen, S; Siedge Frame For Automobile, Has Fixing Splint That is Fixed To Roof Whose Top Surface Is Provided With Chute, And Sliding Clamping Plate Whose One End Is Installed Far Away From Hinge Joint Of Movable Lock Catch; Feb. 22, 2017 (Year: 2017) (Year: 2017).*

Thule Sweden, "Universal Pull Top Ski Carrier", web page/pdf file, 5 pages, published on Nov. 28, 2015, retrieved from Internet Archive Wayback Machine on Feb. 3, 2022, URL https://web.archive.org/web/20151128063032/http://cdn1.static-tgdp.com/assetloader.axd?bimid=92726999&id=265117&brand=Thule&market=US&att=1.

"Non-Final Office Action Received for U.S. Appl. No. 18/589,717, Mailed on Sep. 24, 2024".

* cited by examiner

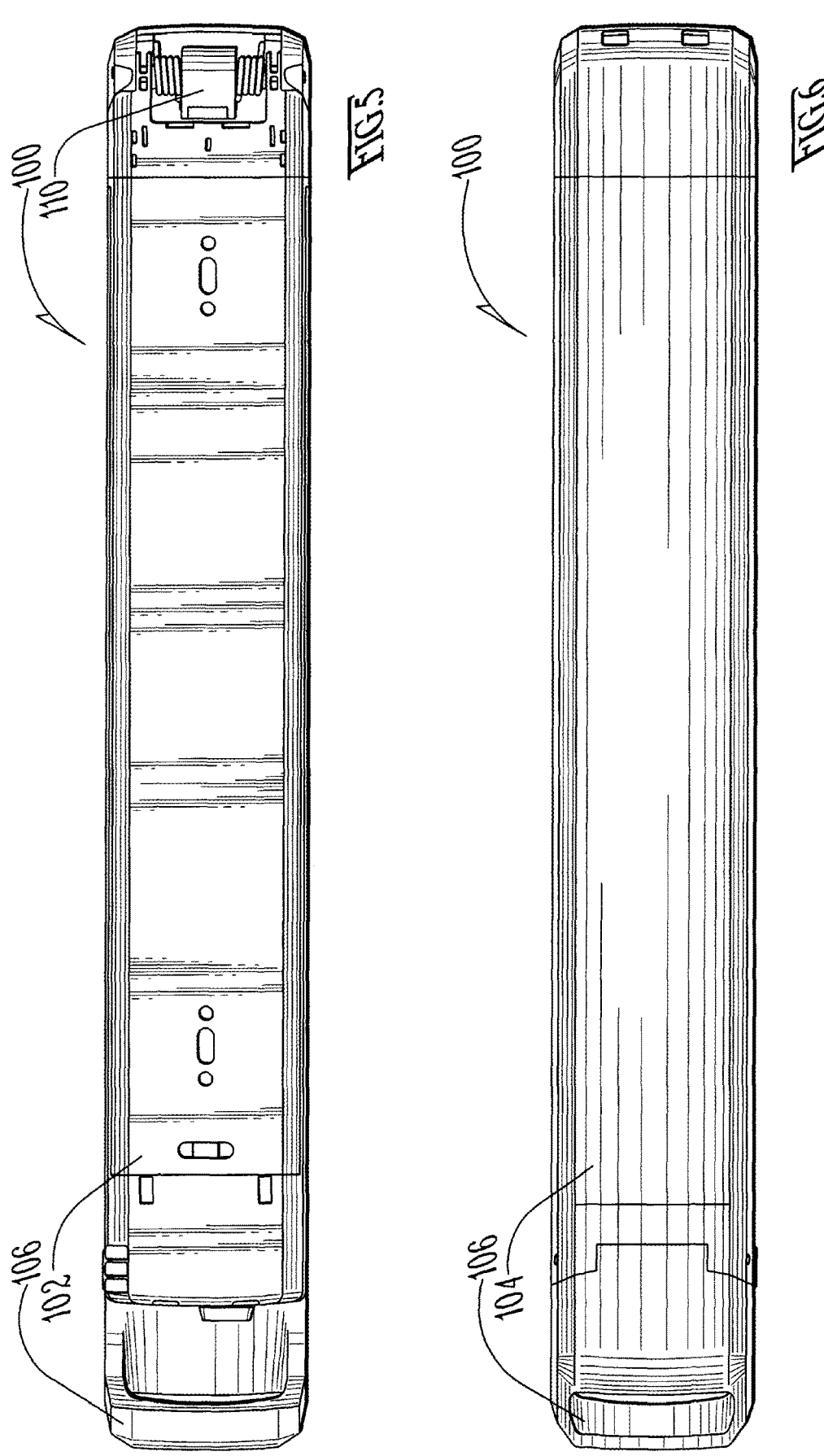

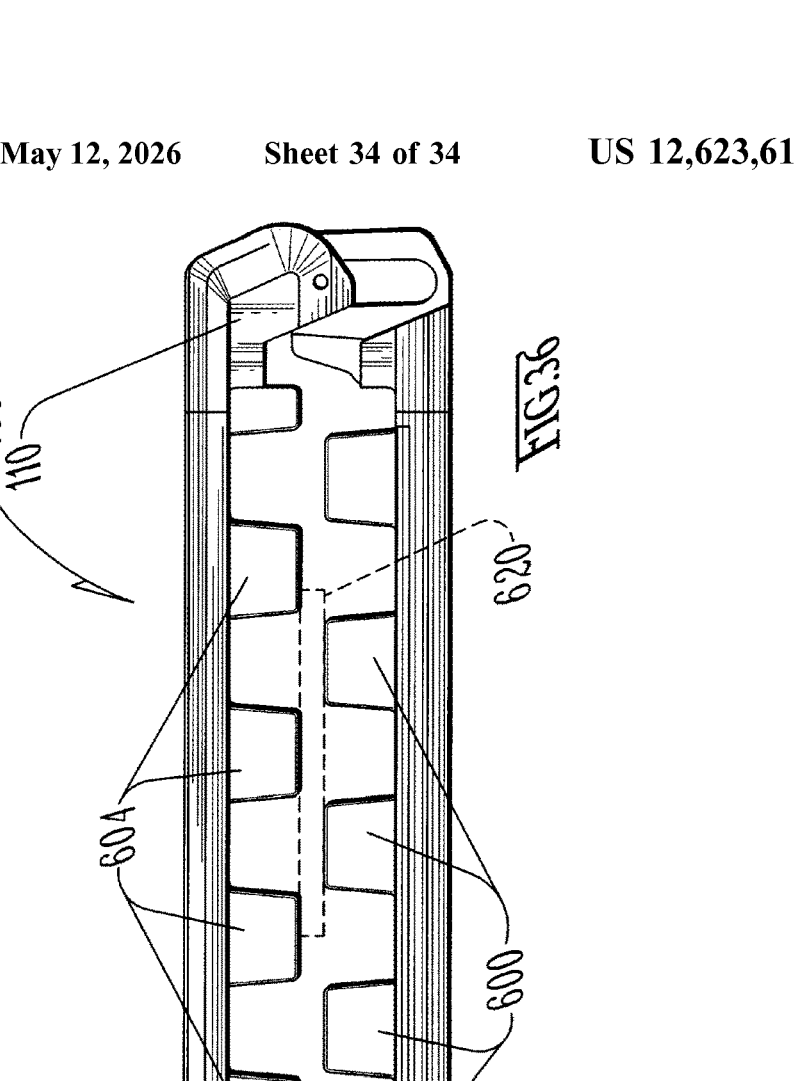
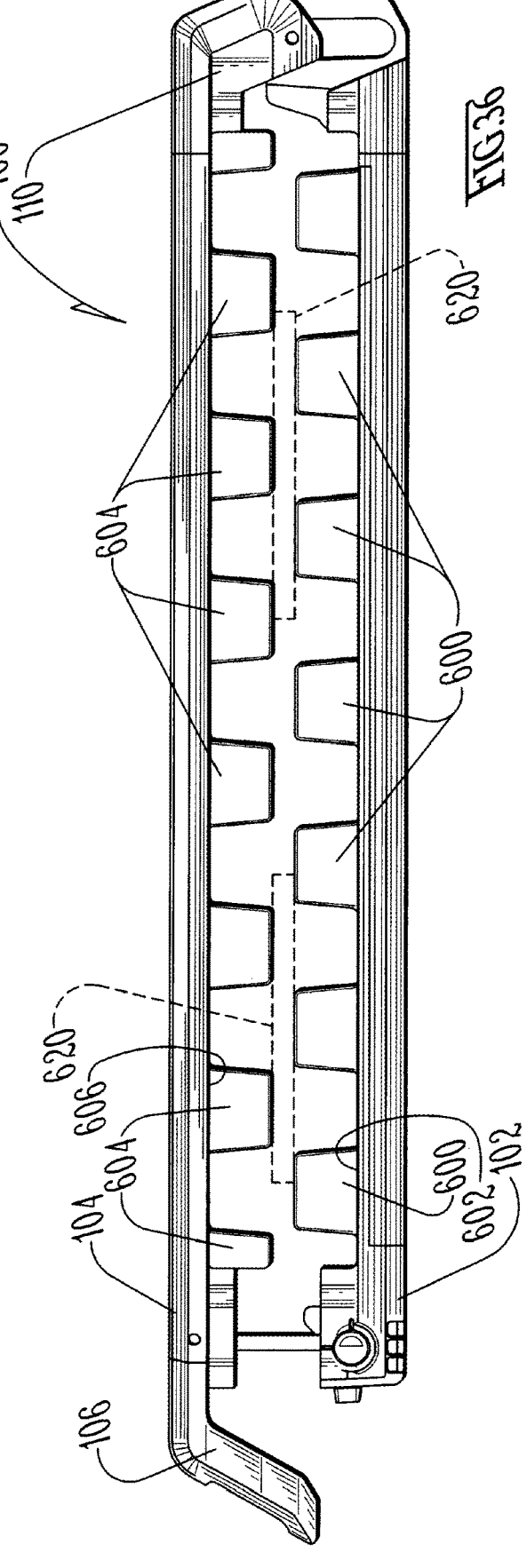
FIG.36

CAR TOP EQUIPMENT RACK

CROSS-REFERENCE TO RELATED APPLICATIONS

This application claims the benefit of U.S. Provisional Patent Application Ser. No. 62/620,870 filed Jan. 23, 2018, and U.S. Provisional Patent Application Ser. No. 62/645,881 filed Mar. 21, 2018, and is a continuation of and claims the benefit of U.S. patent application Ser. No. 16/255,321 filed Jan. 23, 2019, the disclosures of which are incorporated herein by reference.

BACKGROUND

Specialized equipment racks installed on the roof of a car or other vehicle are increasingly popular for transporting equipment for use in sports such as skiing, snowboarding, or other similar activities. Accessing roof racks can be difficult for many people, so maximizing the ease of loading the rack is an important aspect of rack design. Similarly, as racks may be left in place on the vehicle when not in use, compact and aerodynamic designs when equipment is not in the rack are of increasing value.

SUMMARY OF THE INVENTION

The car top equipment rack described herein is a rack for carrying skis, snowboards, and other types of equipment above the roof of a car or other vehicle. In varying embodiments, the rack is provided with an upper rack assembly and a lower rack assembly that are connected at one end by a hinge assembly and at the other end by a latch assembly. The hinge assembly allows the upper rack assembly and the lower rack assembly to be pivoted apart to an open position to allow equipment to be placed on the rack, namely on the upper part of the lower rack assembly.

Once the equipment is placed onto the lower assembly, the upper rack assembly may be pivoted down and latched to the lower rack assembly by the latch assembly in a latched configuration. In this configuration, the equipment is secured between the upper rack assembly and the lower rack assembly.

In some embodiments, the upper rack assembly and the lower rack assembly include a support member extending from their lower and upper surfaces, respectively. The support members may extend along the longitudinally axis of the assemblies to provide support to one or more pieces of equipment placed therein. In some embodiments, the support members extend only partially along the longitudinal axis of the upper or lower assemblies.

In some embodiments, the upper and lower support members may be transversely offset to allow the upper and lower rack assemblies to pivot closer together when no equipment is stored in the rack. In some embodiments, the upper and lower support members may be longitudinally offset to allow the upper and lower rack assemblies to pivot closer together when no equipment is stored in the rack.

In various embodiments, the upper and lower support members comprise multiple protrusions that extend from the upper and lower cross members of the rack assemblies. These protrusions may be positioned, in varying embodiments, in a number of different positions relative to each other. In some embodiments, the lower protrusions may be partially or entirely longitudinally offset from one another (or a subset thereof), and the upper protrusions may be partially or entirely longitudinally offset from one another (or of a subset thereof). In such embodiments, the longitudinally offset upper protrusions may be positioned, in relation to the longitudinally offset lower protrusions, so that when the upper and lower cross members are pivoted to the closed position, the upper and lower protrusions interlock with each other.

In some embodiments there may be more than one grouping of such longitudinally offset protrusions that are partially or entirely transversely offset with respect to the other such groupings. Such groupings may also be partially or entirely longitudinally offset with respect to the other such groupings.

In some embodiments, the rack is provided with an expandable hinge capable of collapsing when the rack is empty and expanding to accommodate equipment loaded into the rack. In other embodiments, the lower portion of the rack is provided with an extending component to allow a user to load equipment onto the rack from the side of the vehicle without having to reach above the vehicle to place equipment on the rack. In yet other embodiments, the rack mounts to the car top using an inventive mounting mechanism.

In some embodiments the rack is provided with a sliding member capable of sliding inwardly and outwardly during the loading of sports equipment onto the rack. In some embodiments, the sliding member may slide outwardly to an extended position for loading equipment on the sliding member. In some embodiments, the sliding member may be translated inwardly with the sports equipment disposed thereon to place the sliding member and the sports equipment in position under the upper cross member for clamping in place.

BRIEF DESCRIPTION OF THE DRAWINGS

FIG. 5 is a bottom plan view of an embodiment of the equipment rack in a closed, collapsed configuration.

FIG. 6 is a top plan view of an embodiment of the equipment rack in a closed, collapsed configuration.

FIG. 36 is a side view of an embodiment of the equipment rack.

DETAILED DESCRIPTION

Figure 1:
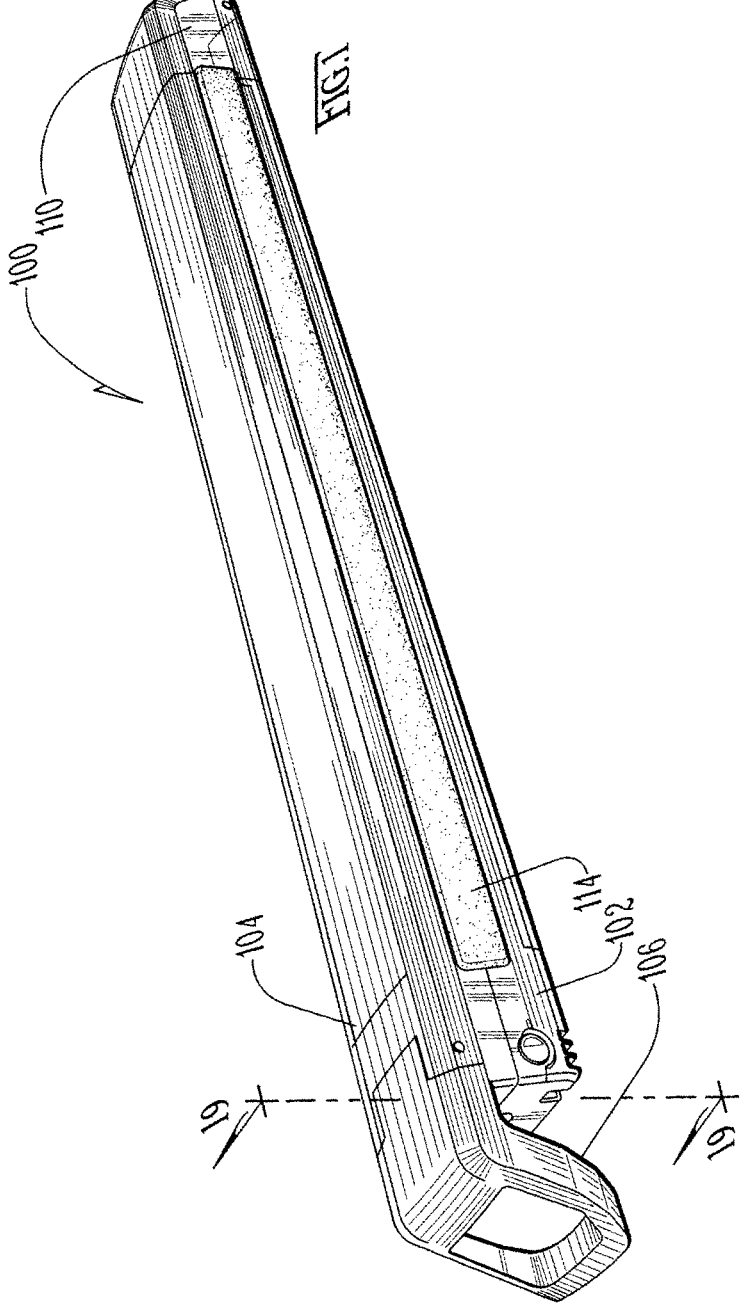
FIG. 1 is a perspective view of an embodiment of the equipment rack in a closed, collapsed configuration.
Figure 2:
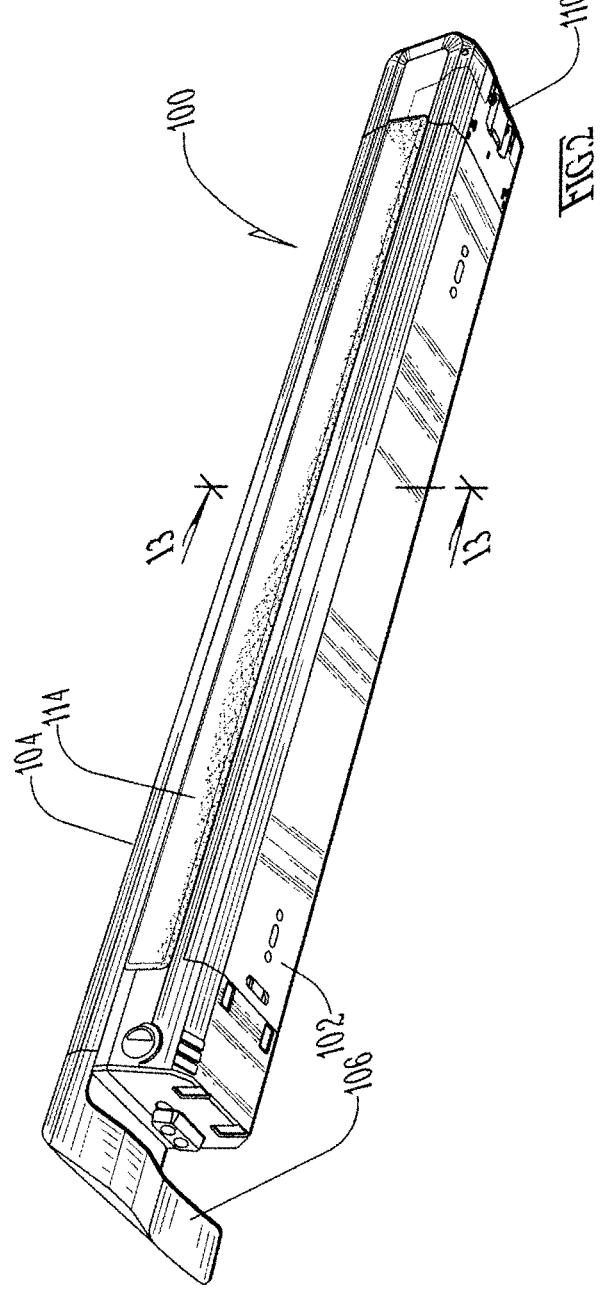
FIG. 2 is a perspective view of an embodiment of the equipment rack in a closed, collapsed configuration.
Figure 4:
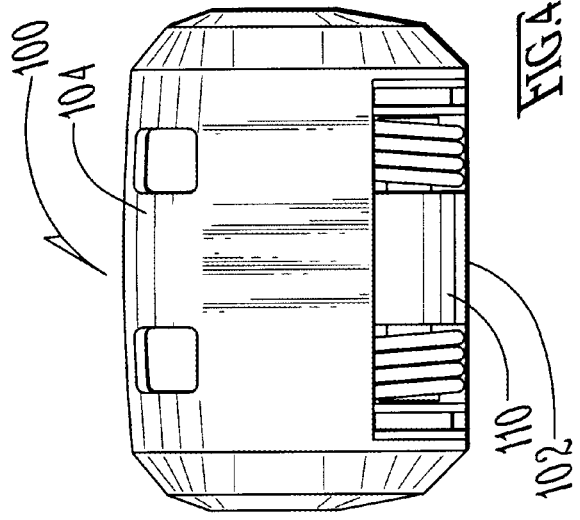
FIG. 4 is an end plan view of an embodiment of the equipment rack in a closed, collapsed configuration.
Figure 3:
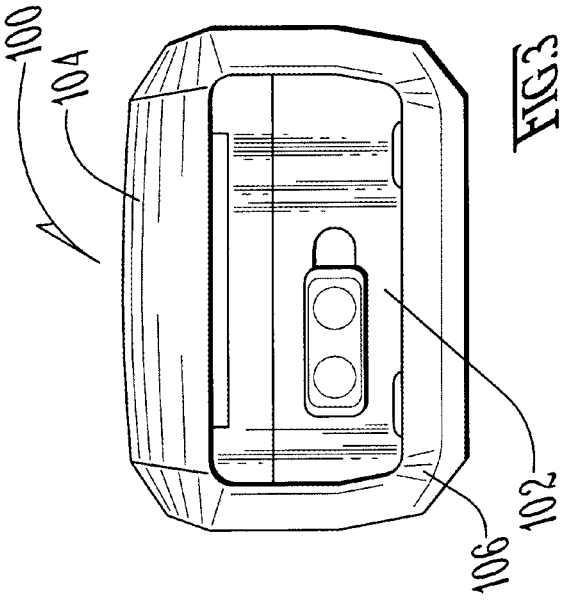
FIG. 3 is an end plan view of an embodiment of the equipment rack in a closed, collapsed configuration.

Referring now to FIGS. 1 and 2, perspective views of an embodiment of the equipment rack are depicted in a closed, collapsed configuration. FIGS. 3, 4, 5, and 6 depict both end, top, and bottom views of an embodiment of the rack in a closed, collapsed configuration, respectively. The depicted embodiment of the equipment rack 100 comprises a lower rack assembly 102, an upper rack assembly 104, a handle assembly at one end of the lower and upper rack assemblies, and an expandable hinge assembly 110 at the other end of the lower and upper rack assemblies 102 and 104.

Figure 7:
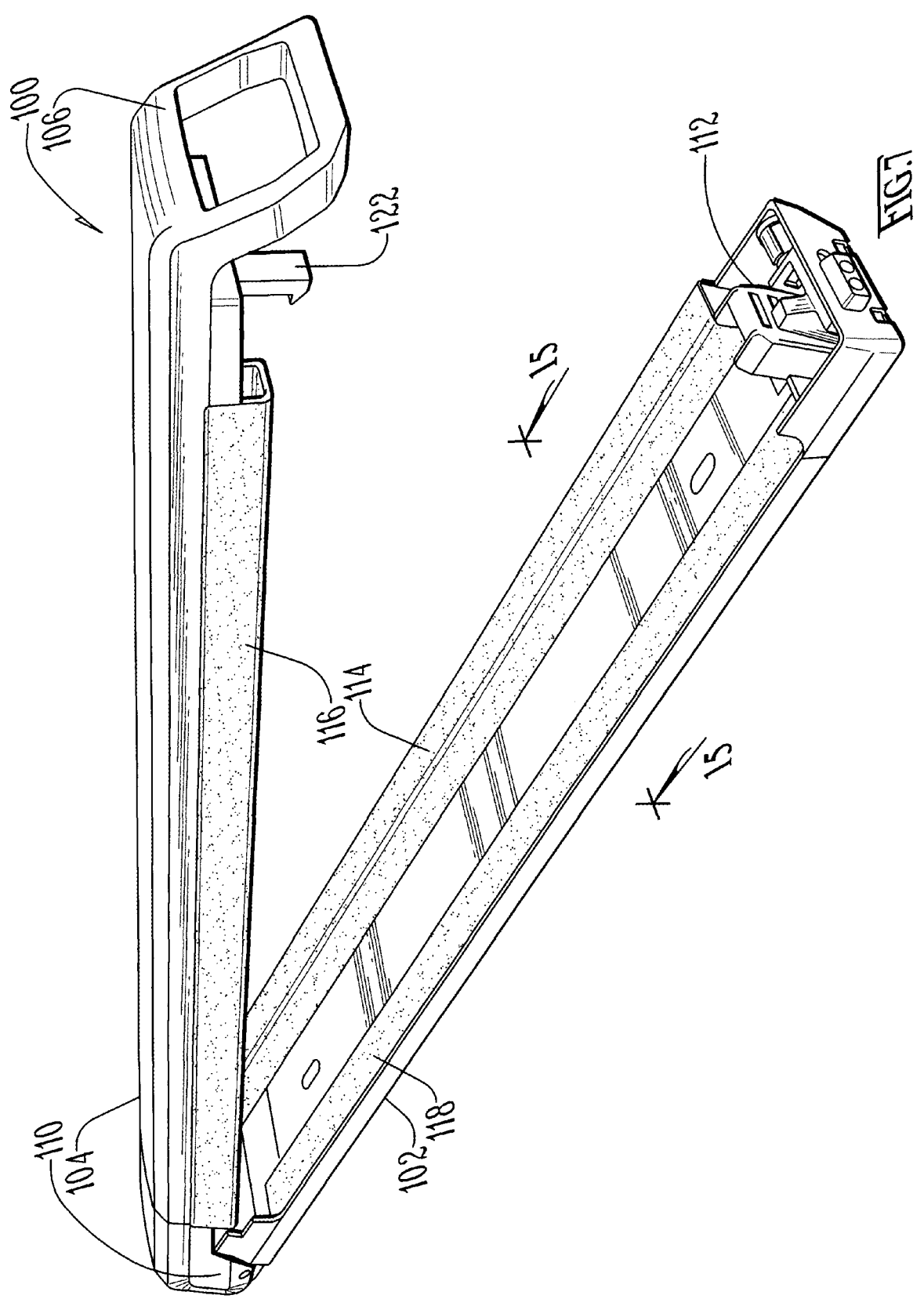
FIG. 7 is a perspective view of an embodiment of the equipment rack in an open configuration.

Referring now to FIG. 7, an embodiment of the rack 100 is depicted in a perspective view in an open configuration. A user of the rack 100 actuates the handle assembly 106 by raising or otherwise actuating the handle, thus unlatching the handle assembly 106 which separates into upper and lower latch assemblies, 122 and 112 respectively, and then raising the handle to raise the upper rack assembly 104 away from the lower rack assembly 102. The upper latch assembly 122 is attached to the upper rack assembly and lifts away from the lower latch assembly 112. In some embodiments, a lock mechanism is provided in the handle assembly 106.

In the embodiment depicted in FIG. 7, the upper rack assembly 104 comprises a cross member that is rigid or semi-rigid to provide structure to the assembly 104, an upper support member 116 for contacting the equipment installed into the rack 100, and an upper support strip 120 (not visible in FIG. 7). In the depicted embodiment, the lower rack assembly 102 comprises a cross member that is rigid or semi-rigid to provide support to the assembly 102, a lower support member 114 for contacting and supporting the equipment installed on the rack, and a lower support strip 118. First ends of the upper and lower cross members are attached to the hinge assembly 110, and second ends of the upper and lower cross members are attached to the latch assembly 112.

Figure 8:
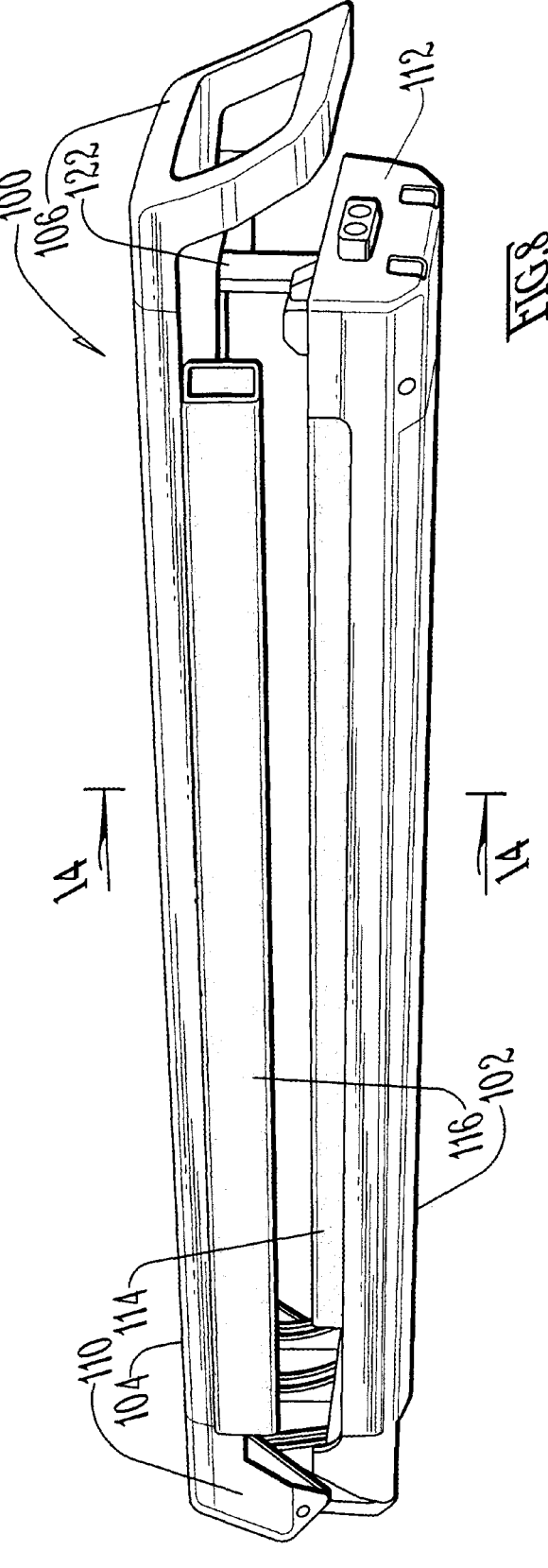
FIG. 8 is a side perspective view of an embodiment of the equipment rack in a closed, expanded configuration.

Referring now to FIG. 8, a perspective view of an embodiment of the rack 100 in an closed, expanded configuration is depicted. The hinge assembly 110 is expanded to accommodate equipment to be installed on the rack 100 while allowing the upper and lower rack assemblies 102 and 104 to be substantially parallel to each other, thus providing secure retention of equipment in the rack 100. The handle assembly also expands to allow the latch assemblies 122 and 112 to engage while the upper and lower rack assemblies 102 and 104 are substantially parallel to each other but spaced apart in the closed, expanded configuration.

Figure 9:
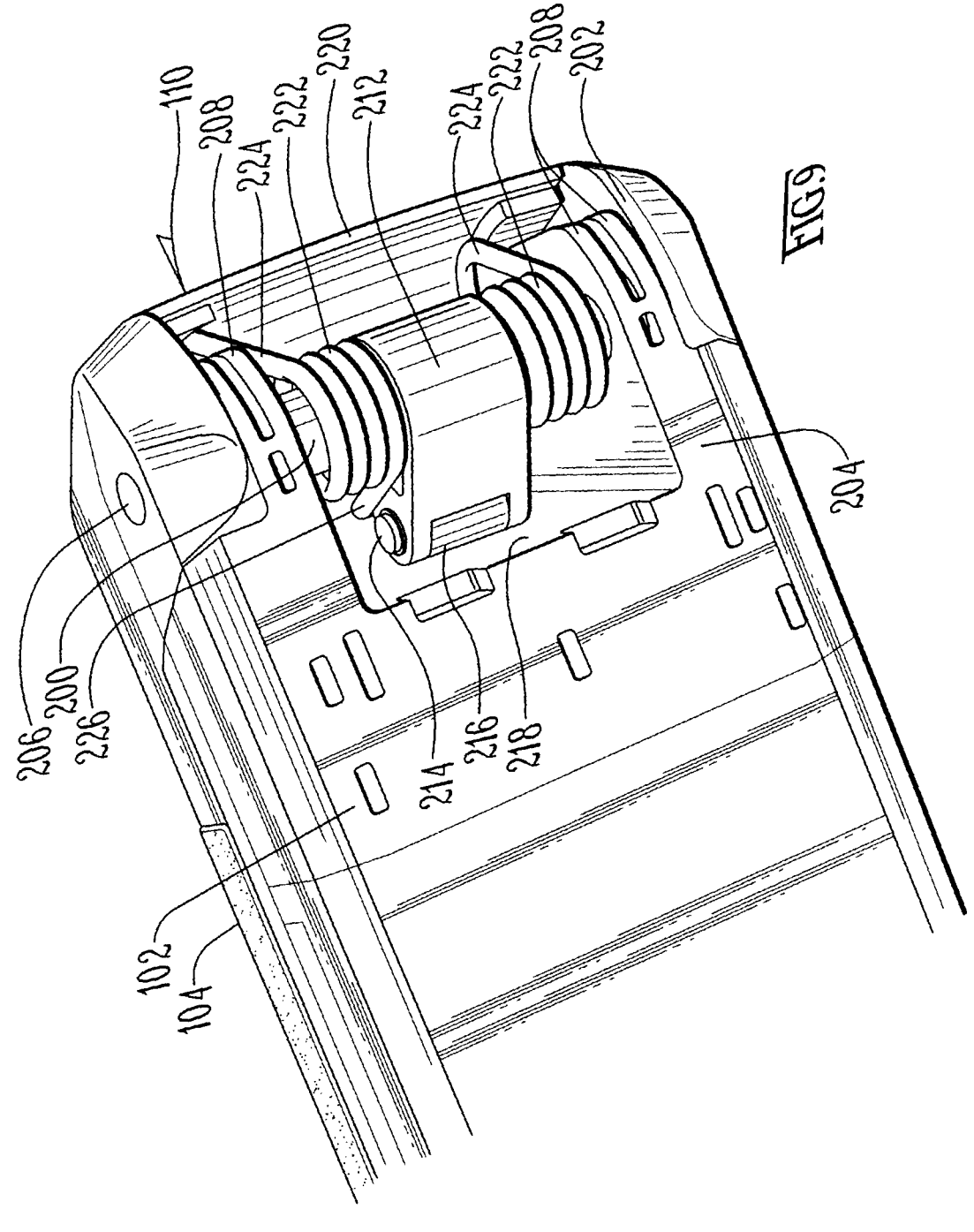
FIG. 9 is a detailed perspective view of a portion of an embodiment of the equipment rack.
Figure 10:
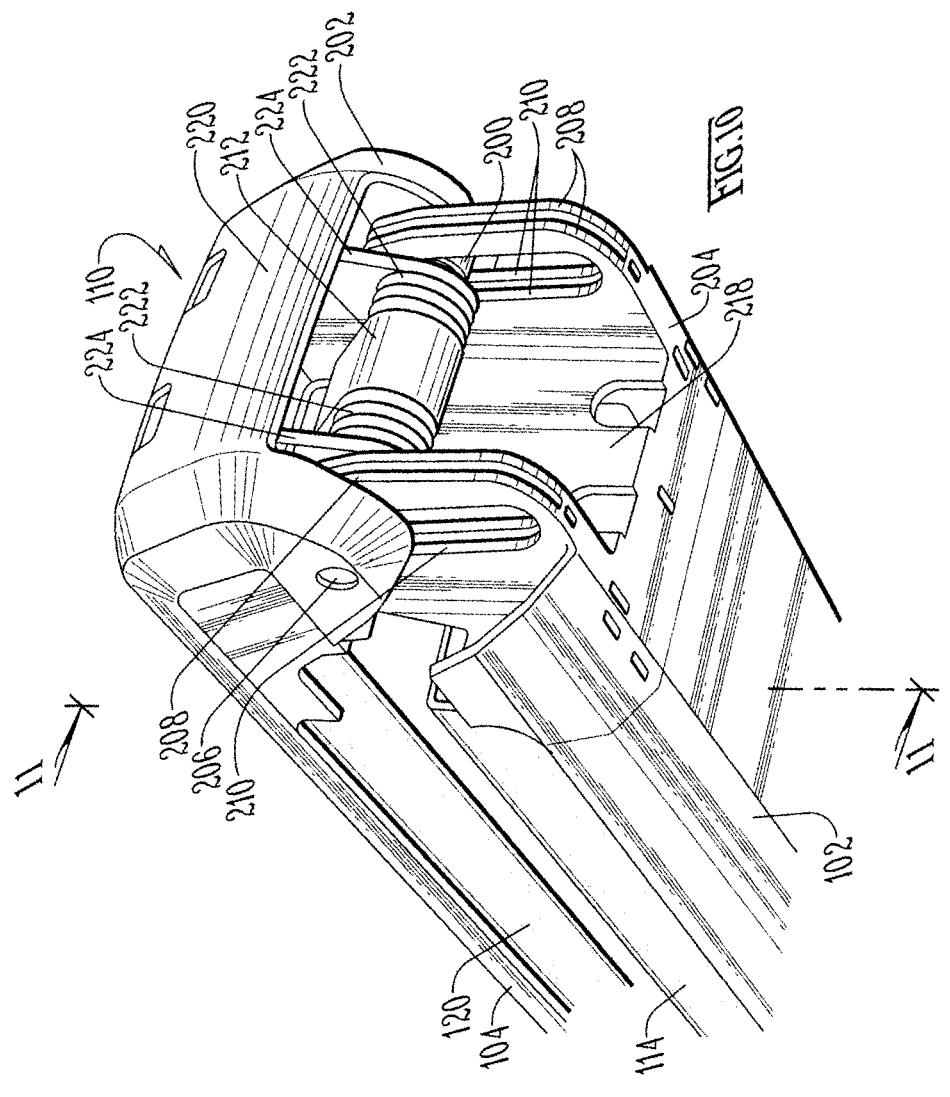
FIG. 10 is a detailed perspective view of a portion of an embodiment of the equipment rack in a closed, expanded configuration.

Referring now to FIGS. 9 and 10, detailed perspective views of a portion of an embodiment of the equipment rack are depicted in collapsed and expanded configurations, respectively. FIG. 9 depicts a bottom view of the expanding hinge assembly 110. FIG. 10 depicts a side perspective view of the hinge assembly 110 in an expanded configuration. The hinge assembly 110 includes a hinge pin 200 around which the hinge pivots, an upper hinge leaf assembly 202, and a lower hinge leaf assembly 204. The upper hinge leaf assembly 202 is attached to the upper rack assembly 104, and the lower hinge leaf assembly 204 is attached to the lower rack assembly 102. During operation, the upper and lower hinge leaf assemblies, 202 and 204, pivot around the pin 200 to allow the upper and lower rack assemblies 104 and 102 to open to receive equipment into the equipment rack 100. When no equipment is loaded into the equipment rack 100 and it is closed, the rack 100 is in a collapsed configuration as shown in FIGS. 1, 2, 9, and 11, with the upper and lower rack assemblies 104 and 102, respectively, immediately adjacent to each other. When equipment is loaded into the equipment rack 100 and it is closed, the rack 100 is in an expanded configuration as shown in FIGS. 10 and 12 to provide room for the equipment between the upper and lower rack assemblies, 104 and 102.

Figure 11:
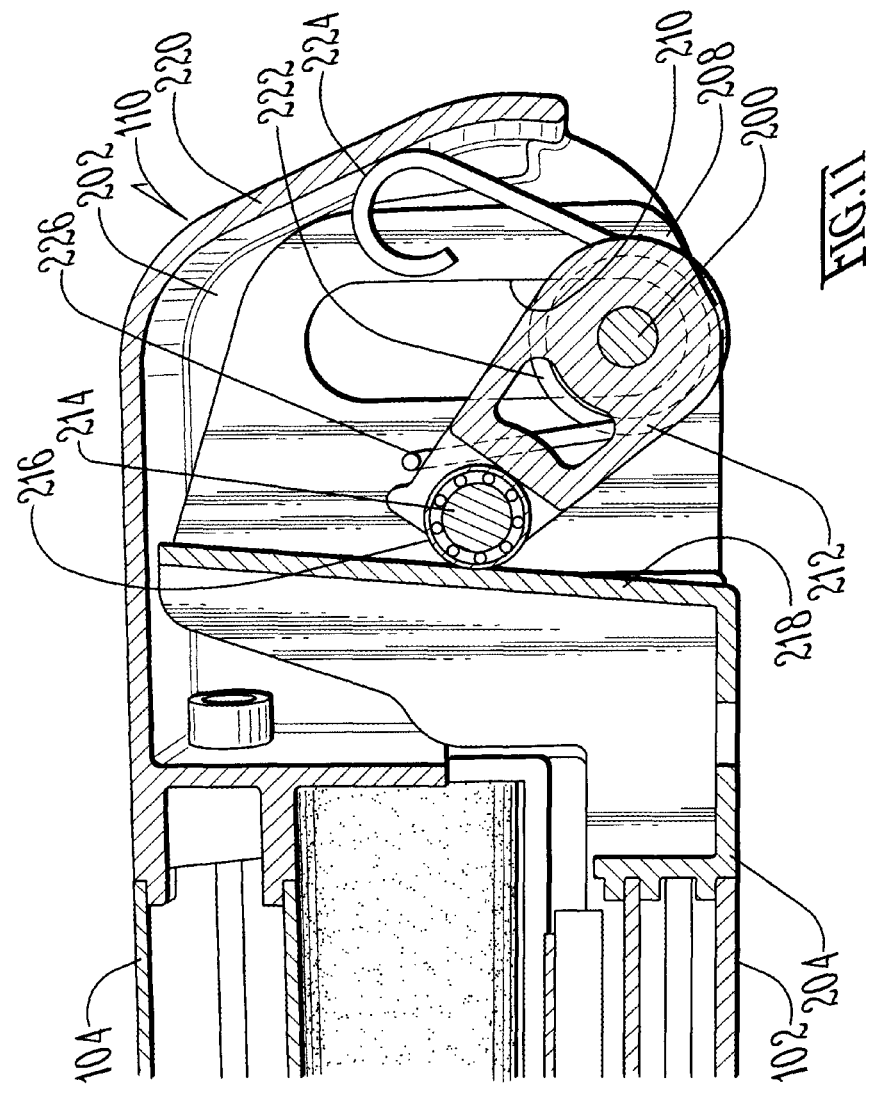
FIG. 11 is a cross-sectional view of a portion of an embodiment of the equipment rack in a closed, collapsed configuration.
Figure 12:
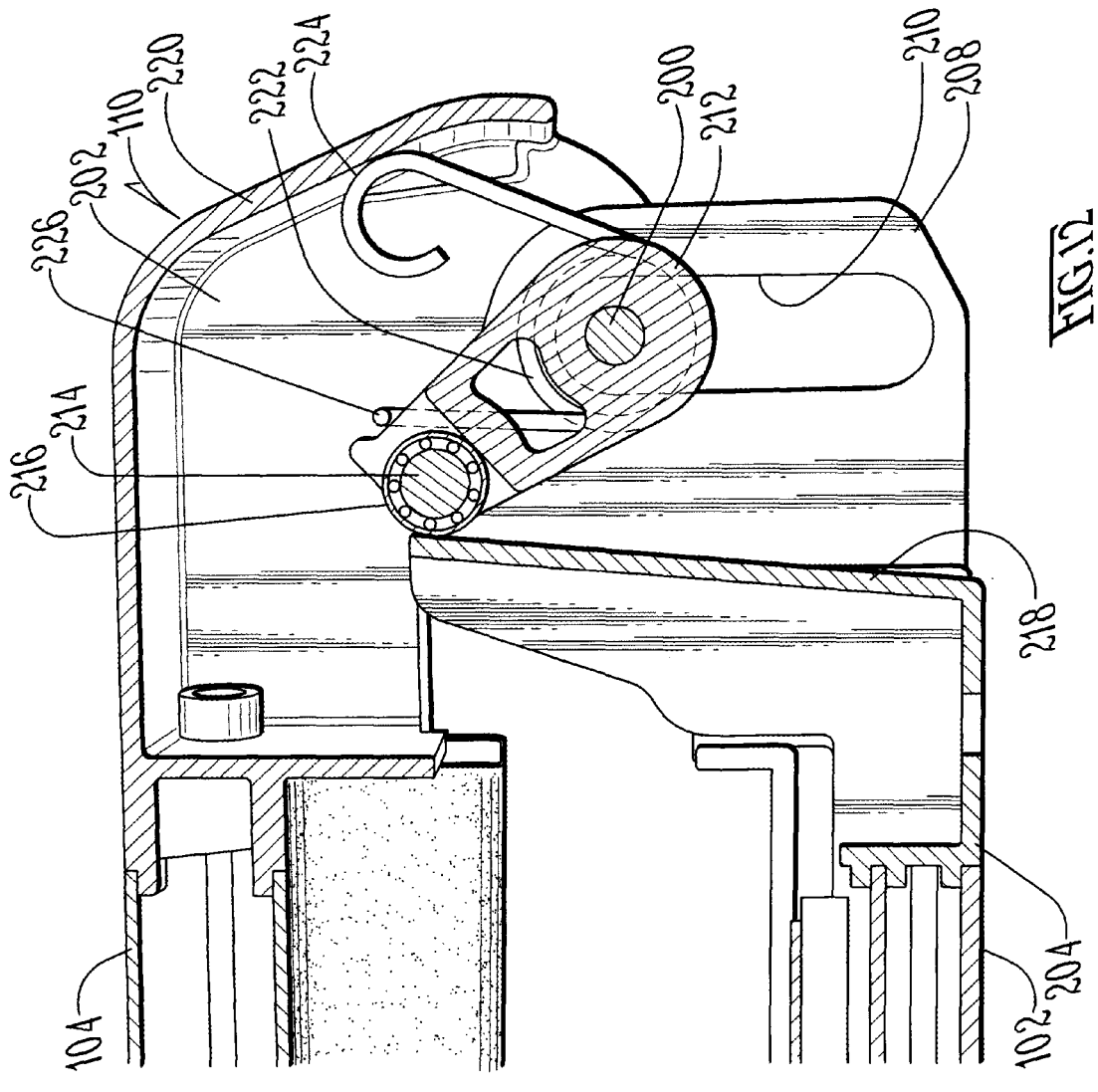
FIG. 12 is a cross-sectional view of a portion of an embodiment of the equipment rack in a closed, expanded configuration.

Referring now to FIGS. 11 and 12, cross-sectional views of a portion of an embodiment of the equipment rack are depicted in collapsed and expanded configurations, respectively. The cross-sectional view is along a section that extends lengthwise approximately along the center axis of the equipment rack 100 between the handle assembly 106 and the hinge assembly 110. FIGS. 11 and 12 depict a short section of the cross-section, including the hinge assembly 110 and short segments of the lower and upper rack assemblies 102 and 104, respectively.

The depicted embodiment of the upper hinge assembly comprises a shell, or frame, 220 that provides structural support to the upper hinge leaf 202 and attaches to the upper rack assembly 104. Shell 220 is provided with two sockets 206 for receiving the hinge pin 200, one socket on either side of the hinge assembly 110. The hinge pin 200 is secured within sockets 206 but may rotate with respect to shell 220. In some embodiments, bearings or bushings are provided to allow rotation of pin 200 in sockets 206. A lever 212 is attached at a first end of the lever 212 to an interior section of hinge pin 200 and extends outwardly away from the lengthwise axis of hinge pin 200 to a second end of lever 212. The lever 212 is fixedly attached to the hinge pin 200 so that as hinge pin 200 rotates around its lengthwise axis, lever 212 also rotates around the same axis.

A roller pin 214 is attached substantially at the second end of lever 212. In the depicted embodiment roller pin 214 is provided with a roller bearing 216 to reduce friction when roller 214 rolls along a surface, and in other embodiments the roller bearing 216 may be a bushing or other similar device or mechanism for reducing friction between two surfaces. One or more coil torsion springs 222 are disposed on hinge pin 200. The coil torsion spring 222 has a spring arm 224 at each end of the spring 222 extending outwardly away from hinge pin 200 and contacting outer shell 220. A second spring arm 226 extends outwardly from a center section of the spring 222 and engages the second end of lever 212. As hinge pin 200 rotates, lever 212 rotates, and engages spring arm 226 to twist or untwist spring 222, and depending on the direction of rotation either increase or reduces the torsion of spring 222. Spring 222 exerts a torque on shell 220 and lever 212 through spring arms 224 and 226, respectively.

In the depicted embodiment the lower hinge leaf assembly 204 comprises a structural member for attaching to one end of lower rack assembly 102, at least two plate members 208, at least two slots 210, and bearing plate 218. The at least two plate members 208 extend from the structural member of 204 and are substantially disposed in a plane that is perpendicular to the axis of rotation of hinge pin 200. Each plate member 208 is provided with a slot 210 for receiving the hinge pin 200 and allowing the hinge pin to move along the length of the slot. The lengthwise axis of the slot 210 is substantially perpendicular to the lengthwise axis of the rack 100 so that as the hinge pin 200 moves up and down along the length of the slot 210, the upper and lower hinge leaf assemblies 202 and 204, and the upper and lower rack assemblies 102 and 104 all move farther apart closer together, respectively.

The bearing plate member 218 is a plate that is disposed in a plane substantially parallel to the lengthwise axis of slot 210, and approximately perpendicular to the lengthwise axis of rack 100.

In some embodiments of the equipment rack 100, the bearing plate member 218 is disposed at an angle such that the upper end of the member 218 is closer to the slot 210 then the lower end of member 218. When the bearing plate member 218 is disposed at the angle tho slot 210, the spring 222 will exert a greater force when the hinge is in the expanded configuration than in the collapsed configuration, which provides for more force exerted by the spring on the plate member 218 and on the upper hinge assembly 202, thus causing the upper rack member 104 to exert more downward force on the items secured in the rack 100.

The expanded and collapsed configurations vary as a result of the location of hinge pin 200 in relation to the lower hinge leaf assembly 204. In the collapsed configuration, hinge pin 200 is disposed in a collapsed position shown in FIG. 11. In the expanded configuration, hinge pin is disposed in an expanded position shown in FIG. 12.

Referring now to FIGS. 9 and 11, hinge 110 is depicted in the collapsed configuration. Hinge pin 200 is disposed in the first end of slot 210 that brings the hinge leaf assemblies and the upper and lower rack assemblies 102 and 104 into the closest positions, with no equipment in the rack 100, and in this embodiment, lower support member 114 and upper support member 116 are adjacent to upper support strip 120 and lower support strip 118, respectively.

Referring now to FIGS. 10 and 12, hinge assembly 110 is depicted in the expanded configuration. Hinge pin 200 is disposed in the second end of slot 210 that expands the hinge leaf assemblies and the upper and lower rack assemblies into the most spaced apart configuration, with the upper and lower support members 116 and 114 spaced apart from the lower and upper support strips 118 and 120, respectively.

When hinge assembly 110 is moving from the collapsed to the expanded configurations, and vice versa, bearing 216 rolls along bearing plate 218 to maintain the spring force of spring 222 between the upper and lower hinge leaf assemblies. The force of the spring 222 is communicated to the upper hinge leaf assembly 202 through spring arm 224, and to the lower hinge leaf assembly 204 by spring arm 226 pressing on lever 212 which in turn presses on bearing plate 218.

Figure 13:
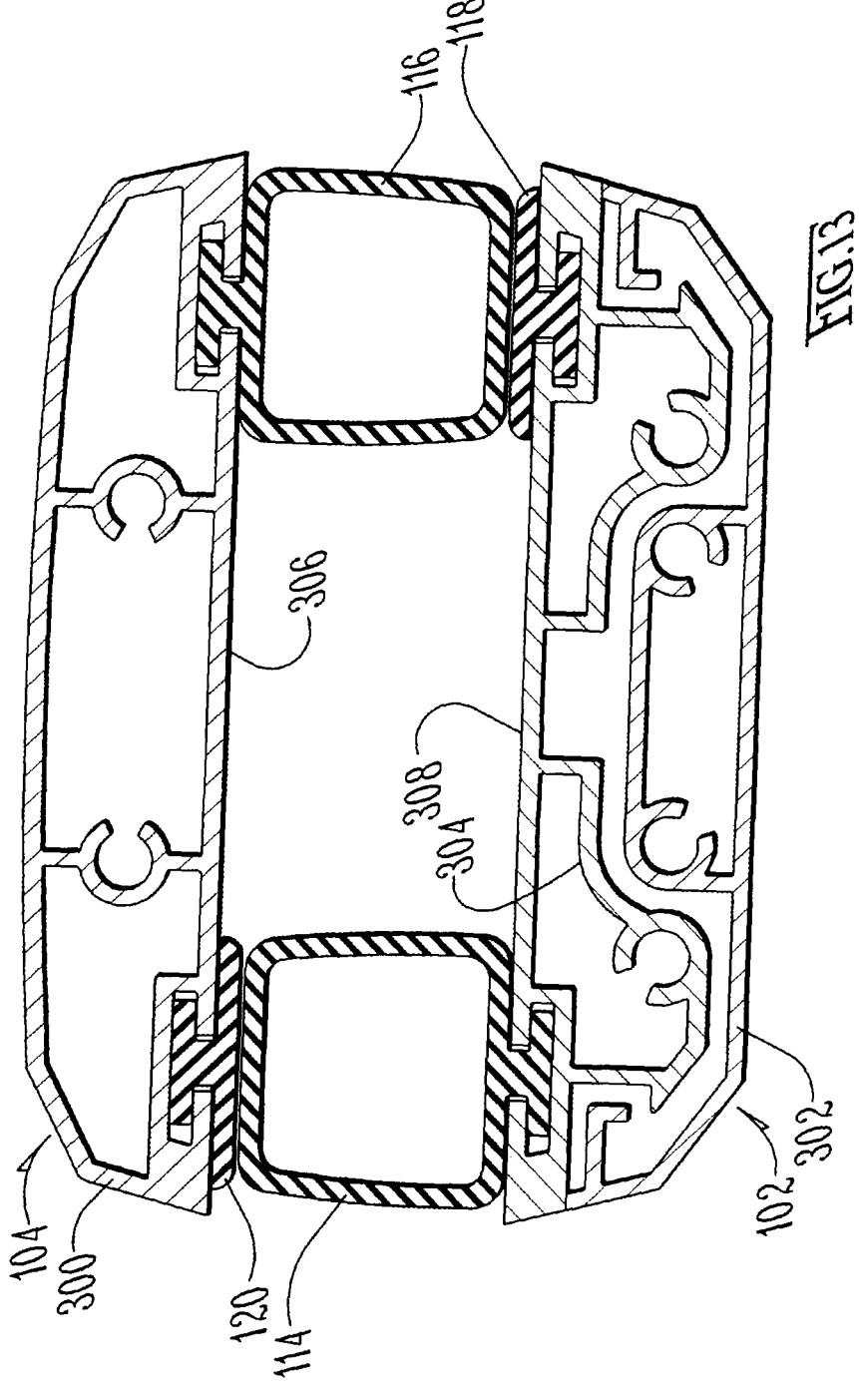
FIG. 13 is a cross-sectional view of an embodiment of the equipment rack in a closed, collapsed configuration.
Figure 14:
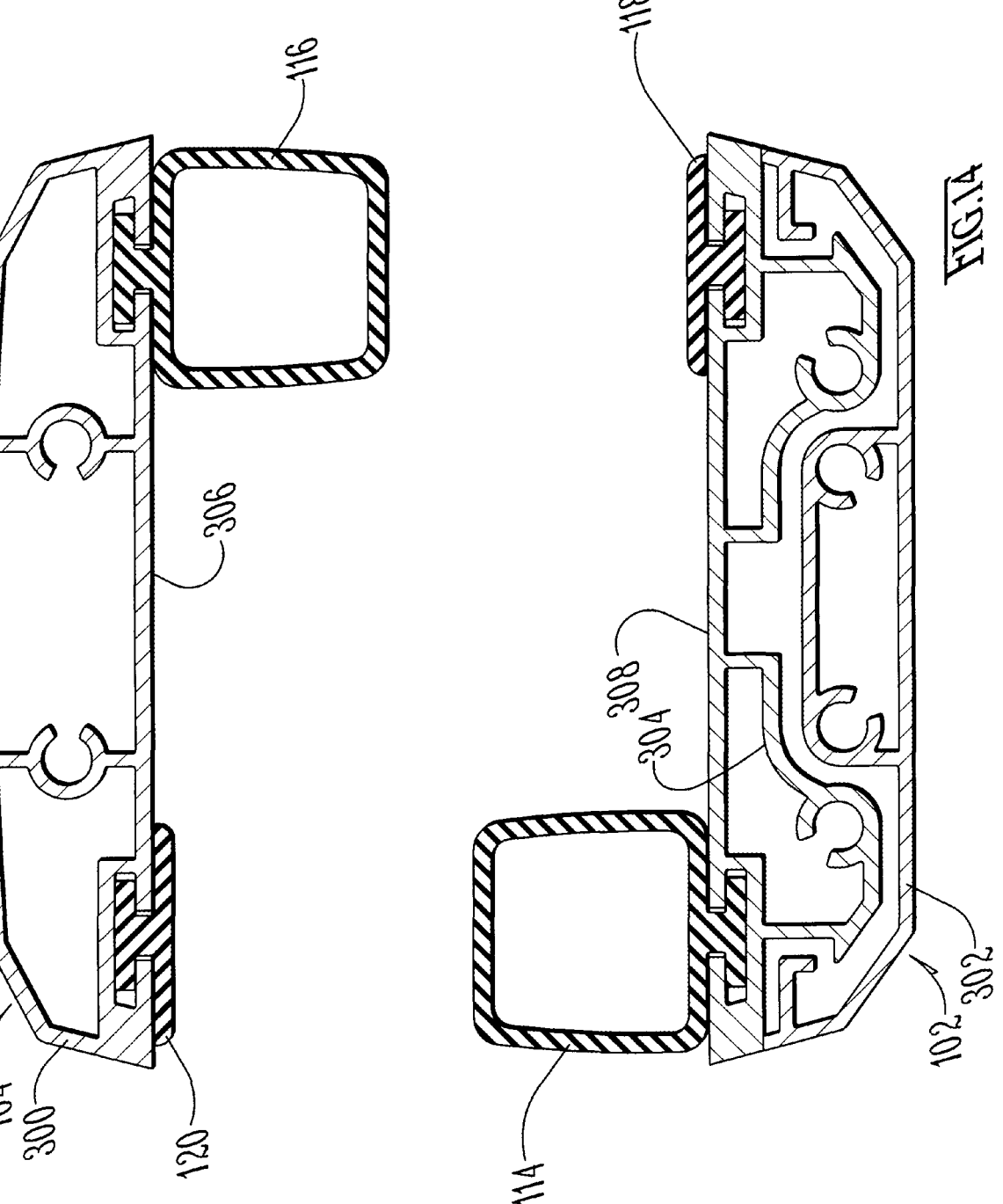
FIG. 14 is a cross-sectional view of an embodiment of the equipment rack in a closed, expanded configuration.

Referring now to FIGS. 13 and 14, cross-sectional views of an embodiment of the equipment rack 100 are depicted, in collapsed and expanded configurations, respectively. The cross-sectional views in a plane that is perpendicular to the lengthwise axis of the equipment rack 100.

In the embodiment depicted in FIGS. 13 and 14, upper rack assembly 104 comprises top cross member 300 which is a semi-rigid structural member, an upper support member 116 attached to the bottom surface 306 of top cross member 300, and an upper support strip 120 also attached to the bottom surface 306 of top cross member 300. The upper support member 116 is attached to bottom surface 306 along a first side edge of the top cross member, and member 116 extends along substantially the entire length of top cross member 300. The upper support strip 120 is disposed along a second side edge of the top cross member 300, and strip 120 extends along substantially the entire length of the top cross member 300. The upper support member 116 and the upper support strip 120 are spaced apart depending on the width of top cross member 300. In some embodiments the strips and supports are spaced inwardly away from the edge of the cross member, and in some embodiments the strip and support may be adjacent to each other.

In the embodiment depicted in FIGS. 13 and 14, lower rack assembly 102 comprises a bottom cross member 302 which is a semi-rigid structural member, a sliding member 304 which is a semi-rigid structural member, a lower support member 114, and a lower support strip 118. The lower support member 114 is attached to a top surface 308 of sliding member 304 along a first side edge of the sliding member 304, and member 114 extends substantially along the entire length of sliding member 304. The lower support strip 118 is disposed along a second side edge of the sliding member 304, and extends substantially along the entire length of sliding member 304. The lower support member 114 and the lower support strip 118 are spaced apart depending on the width of sliding member 300. In some embodiments the strips and supports are spaced inwardly away from the edge of the cross member, and in some embodiments the strip and support may be adjacent to each other. Not all of the embodiments of the rack 100 need include a sliding member.

When the depicted embodiment of the rack 100 is in the collapsed configuration as shown in FIG. 13, the upper support member 116 is adjacent to or in contact with the lower support strip 118, and the upper support strip 120 is adjacent to the lower support member 114. In some embodiments the support strips may not be provided at all and the support members will be adjacent to or in contact with the other cross member.

When the rack 100 is in the expanded position as shown in FIG. 14, the support members and support strips are spaced apart sufficient to allow skis, snowboards, or other equipment to be disposed between support members 114 and 116, which are the main support components of the rack 100 that contact and support the equipment stowed in the rack.

Top cross member 300, bottom cross member 302, and sliding cross member 304 are composed of structural elements designed to provide a semi-rigid structural members, and the exact depiction of the shape and configuration of the outer shells and interior members of each of the cross members is not limiting of the invention. Any designs of the cross members that provide a semi-rigid structural element capable of bearing load forces typical for a car top equipment rack may be used in place of the depicted members. These members may be made of metal, certain plastics, or any other suitably rigid and durable material.

The upper and lower support members and upper and lower support strips are designed to contact and provide support to the skis, snowboards, or other equipment that may be carried in rack 100. They are made of materials selected for the ability to provide support and grip the equipment, but also to cushion and hold the equipment without damaging it. In some embodiments, the support strips and support members are made of rubber, plastic, or other materials with similar properties. The support members and support strips may be attached to the upper and lower rack assemblies in any manner known for attaching those kinds of materials to rigid or semi-rigid structure. In the depicted embodiment, the support members and support strips are provided with a T-shaped flange that runs the length of the support members and strip members. The upper and lower rack assemblies are provided with T-shaped slots for receiving the T-shaped flanges. In other embodiments, the flanges may be of different cross-sections, or screws, rivets, glue, or other means of fastening may be used to attach the components together.

Sliding member 304 is provided with features to allow it to slide into complimentary features in the bottom cross member 302. The features allow the sliding member 304 to slide outwardly from the bottom cross member 302 away from hinge assembly 110, but not to lift upwards away from cross member 302. The lower hinge leaf assembly 204 is attached to bottom cross member 302 so that sliding member 304 may slide in and out during use. The exact depiction of the features shown in the figures is not limiting of the inventive rack described herein.

Figure 15:
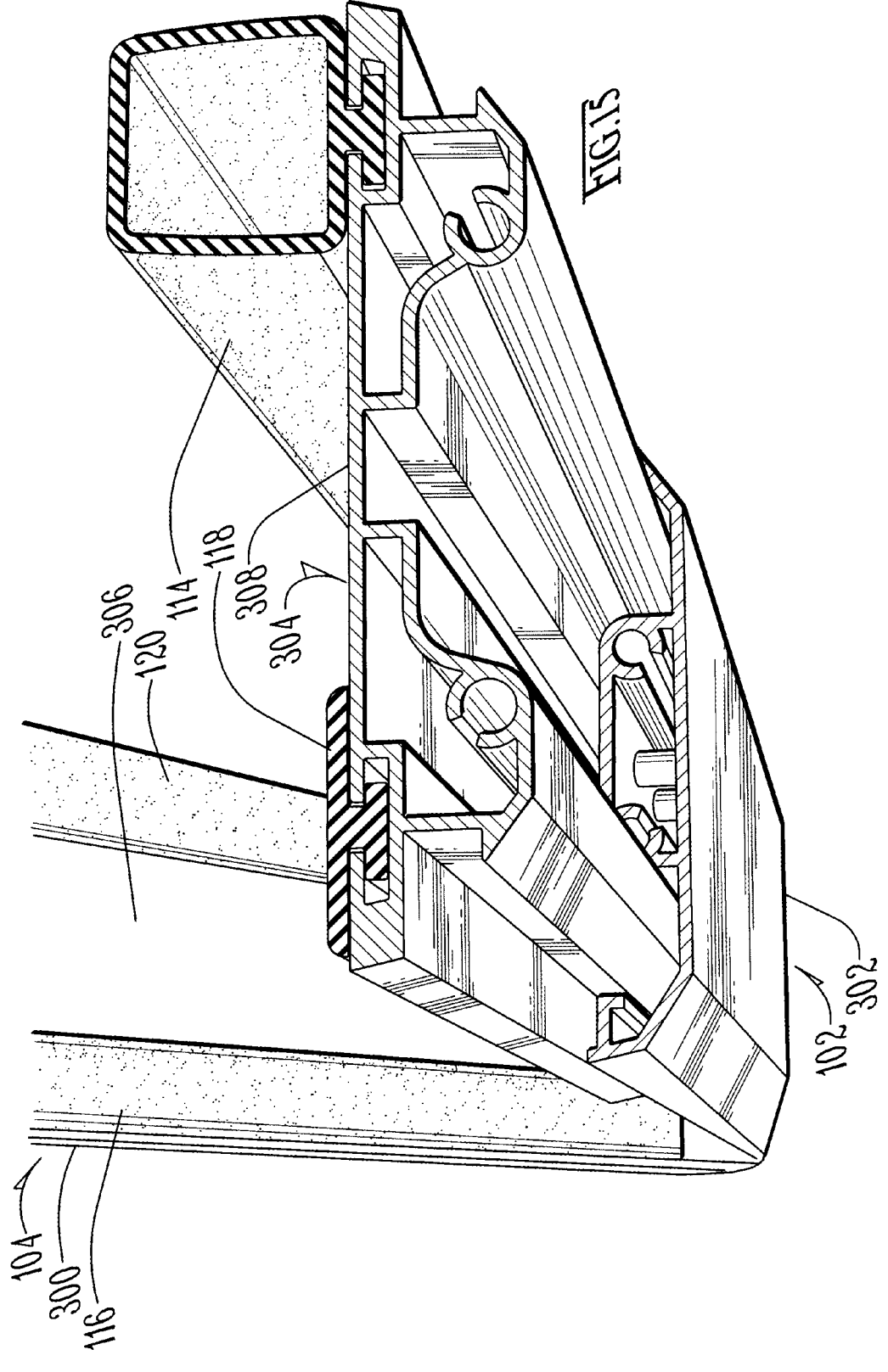
FIG. 15 is a perspective view of a portion of an embodiment of the equipment rack in an extended configuration.
Figure 16:
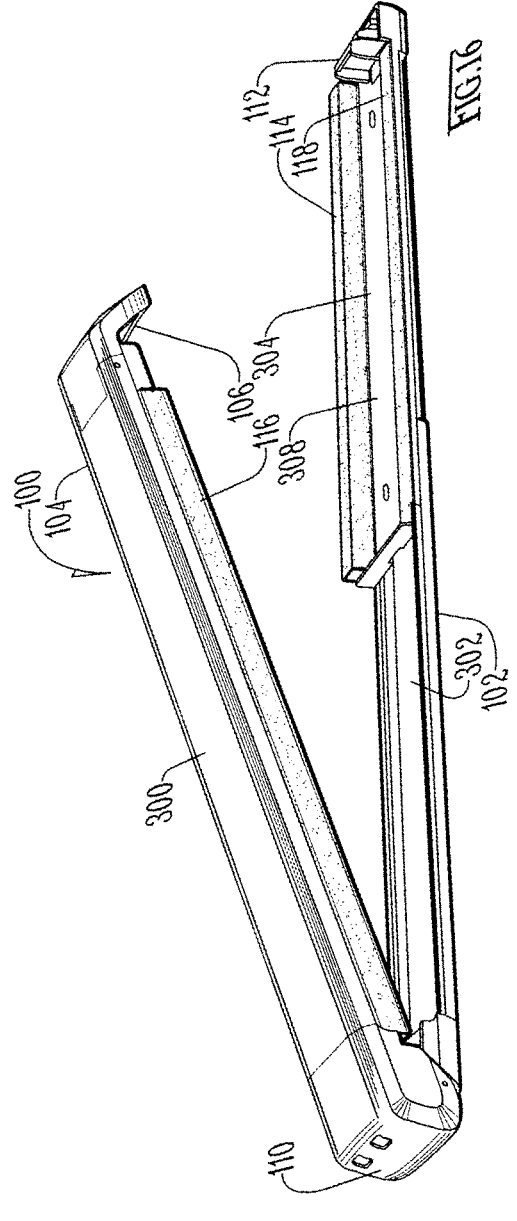
FIG. 16 is a perspective view of an embodiment of the equipment rack in an extended configuration.
Figure 17:
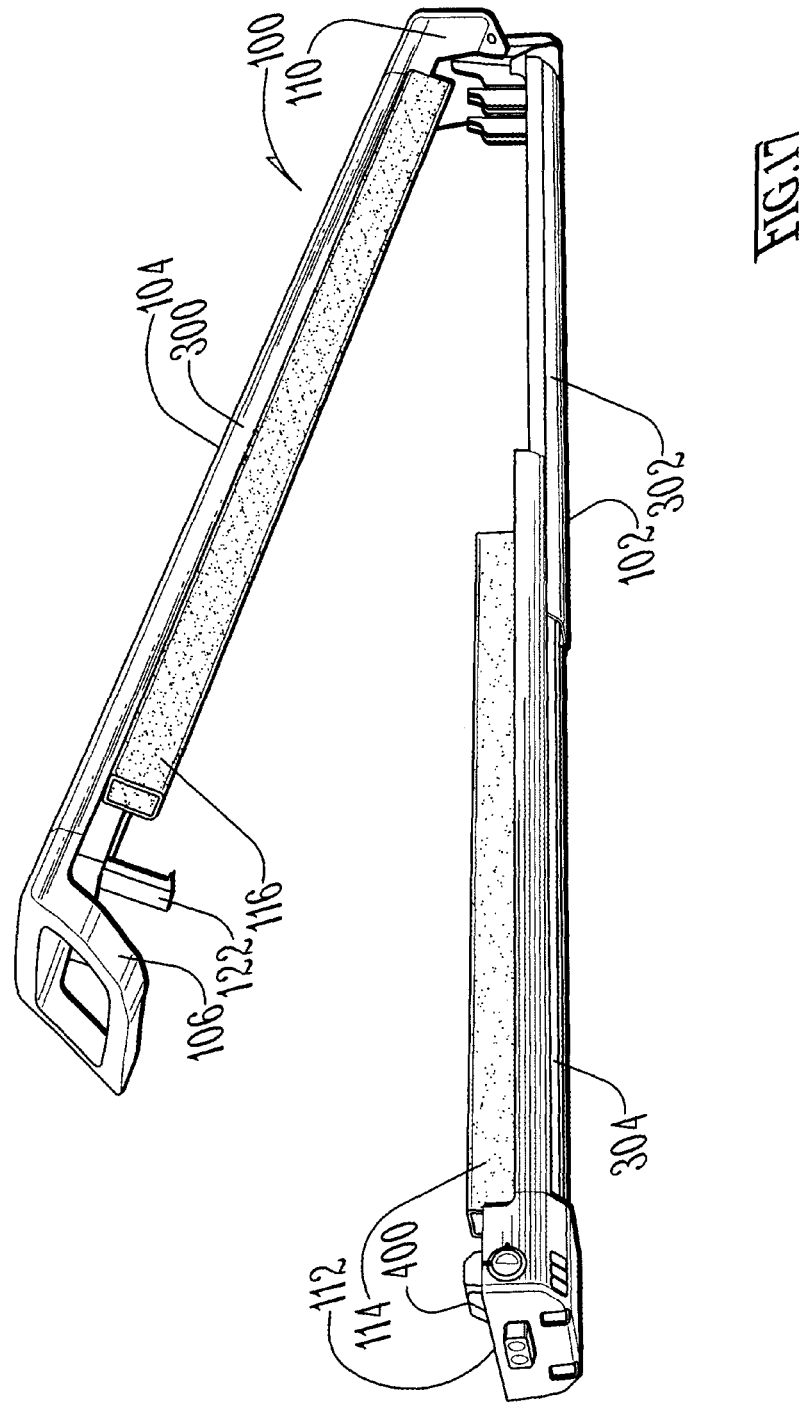
FIG. 17 is a perspective view of an embodiment of the equipment rack in an extended configuration.
Figure 18:
FIG. 18 is a perspective view of the latch portion of an embodiment of the equipment rack in a closed, expanded configuration.
Figure 19:
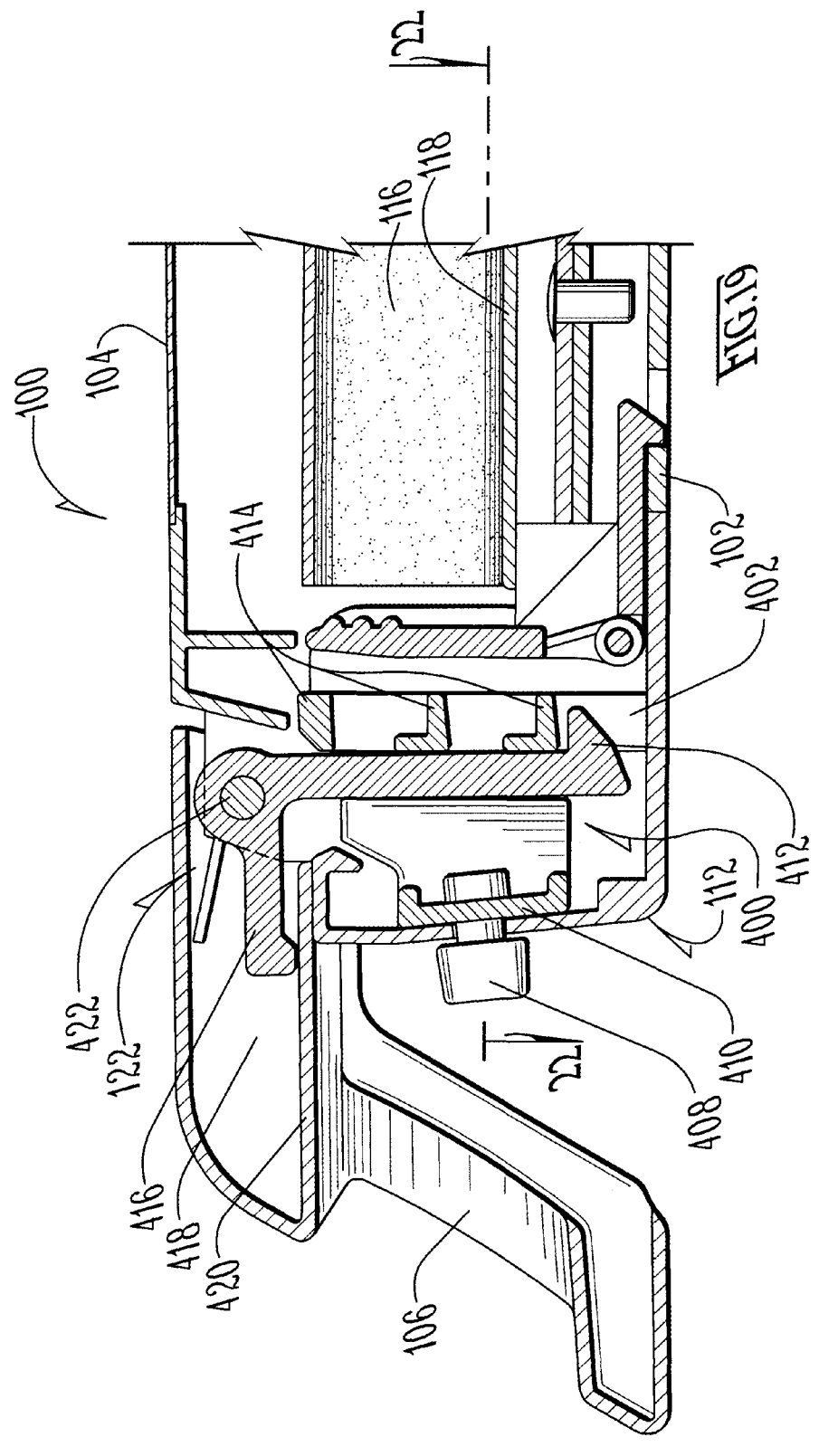
FIG. 19 is a cross-sectional view of the latch portion of an embodiment of the equipment rack in a closed, collapsed configuration.
Figure 20:
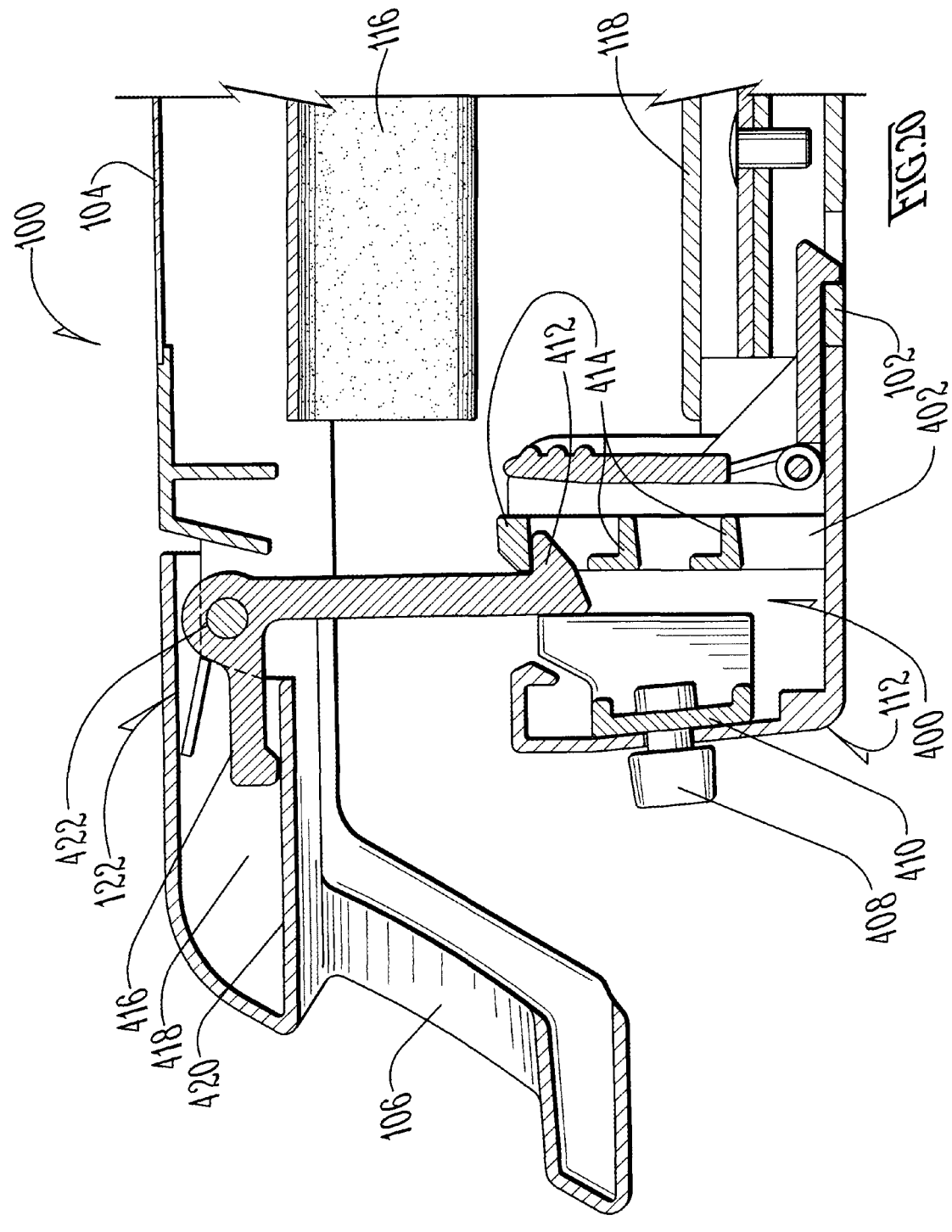
FIG. 20 is a cross-sectional view of the latch portion of an embodiment of the equipment rack in a closed, expanded configuration.
Figure 21:
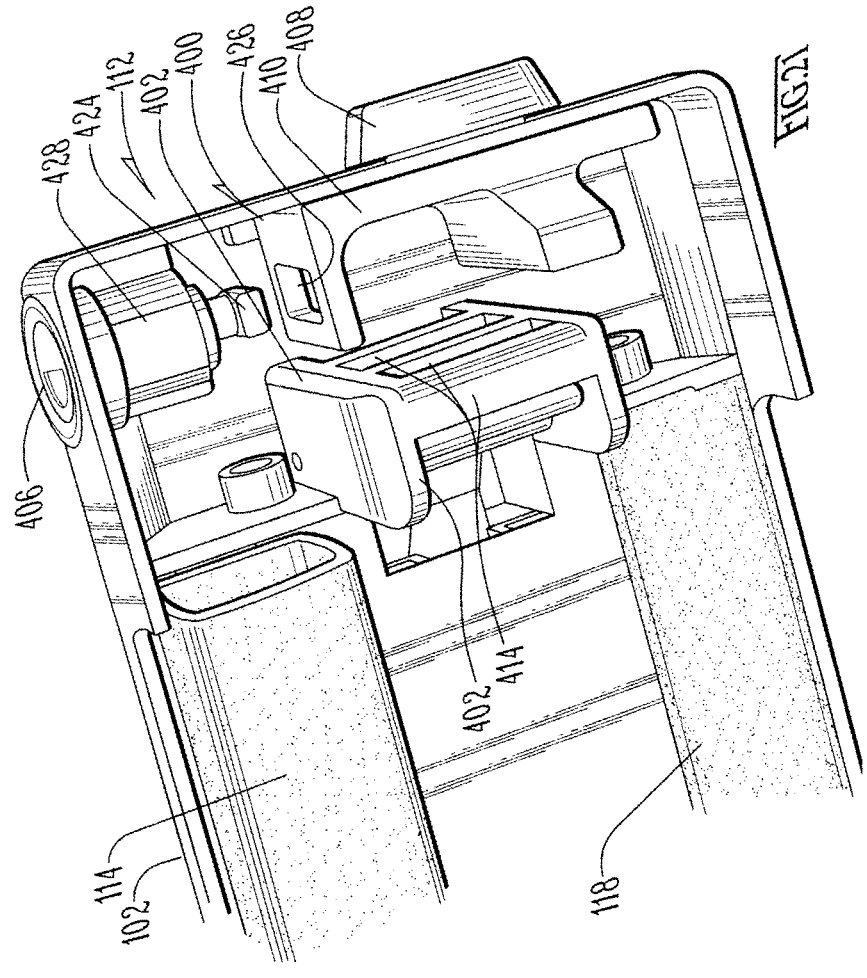
FIG. 21 is a perspective view of the latch portion of an embodiment of the equipment rack.
Figure 22:
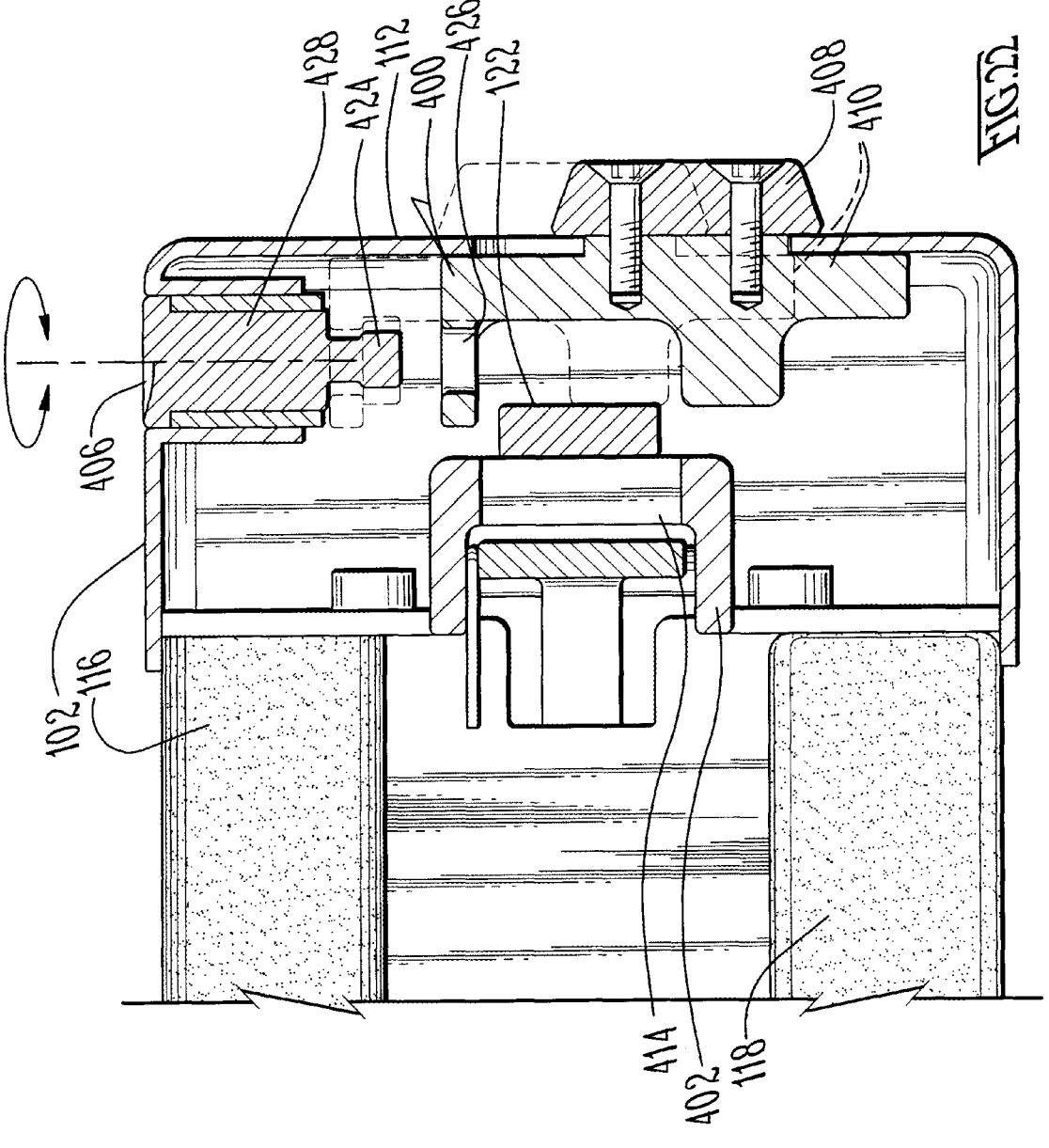
FIG. 22 is a cross-sectional view of the latch portion of an embodiment of the equipment rack.

Referring now to FIGS. 15, 16, and 17, perspective views of an embodiment of the sliding cross member 304 in an extended position are depicted. The lower latch assembly 600 is attached to an end of sliding cross member 304 so that as sliding cross member is slid out of lower cross member 302, the lower latch assembly 600 also extends on the end of sliding cross member 304.

When embodiments of the rack 100 with the sliding member 324 are installed on the roof of a vehicle, the extended position places the sliding cross member over the side of the vehicle, or near thereto, instead of directly above the roof of the vehicle. This positioning to the side of the vehicle allows a user of the rack to load and unload equipment from the rack in the extended position, which is more convenient then reaching above the vehicle to load equipment onto the rack. Once the equipment is loaded onto the sliding cross member 304, it is retracted into lower cross member 302, and upper rack assembly 104 is closed to secure the equipment in the rack on top of the vehicle. In some embodiments the rack 100 may be installed on the vehicle so that the sliding member extends over an adjacent portion of the roof of the vehicle, instead of over the side of the vehicle. This configuration is also acceptable and provides improved characteristics because equipment may be loaded onto the rack without regard for the upper rack assembly, which can get in the way of loading racks that are not provided with the sliding cross member.

FIGS. 18-22 depict various views of the handle assembly with specific reference to the latch and lock mechanisms provided to secure the rack 100 in the closed position, and to accommodate the expansion of the hinge while keeping the upper and lower rack assemblies in a substantially parallel relationship to each other.

Figure 23:
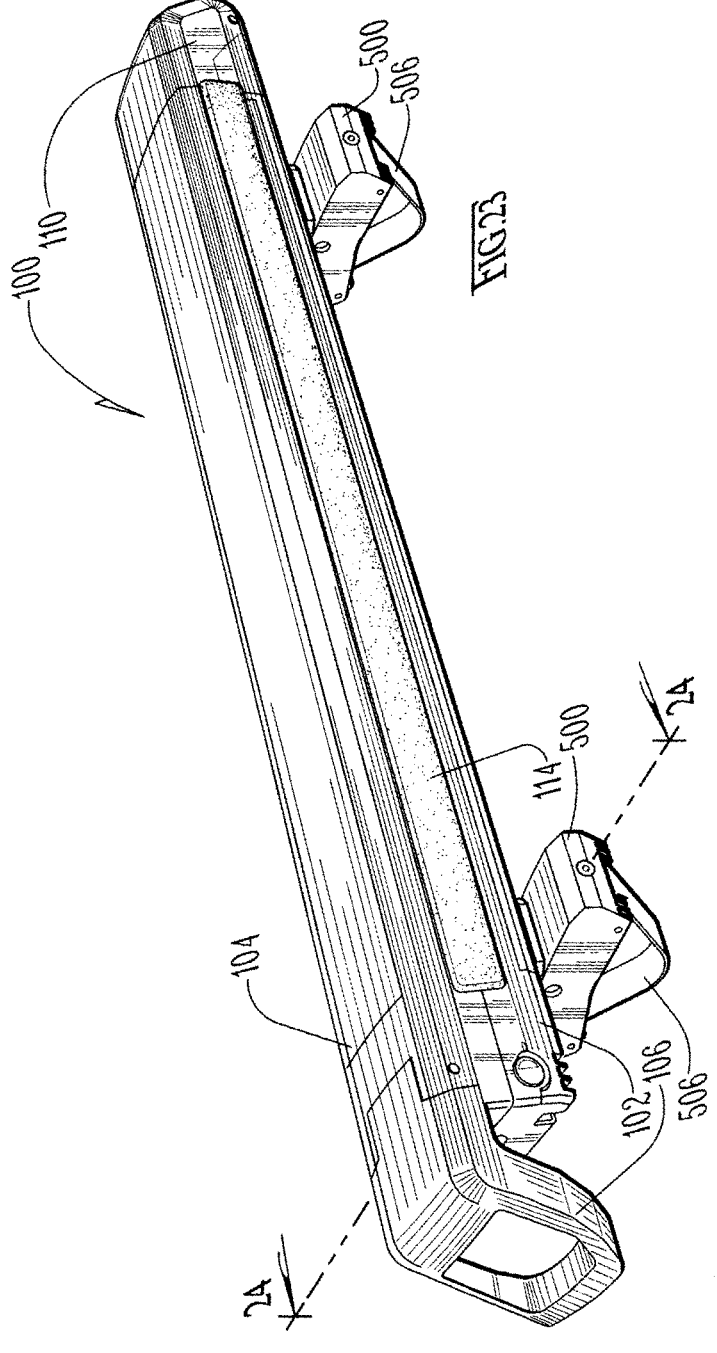
FIG. 23 is a perspective view of an embodiment of the equipment rack with two mount assemblies attached to the rack.
Figure 24:
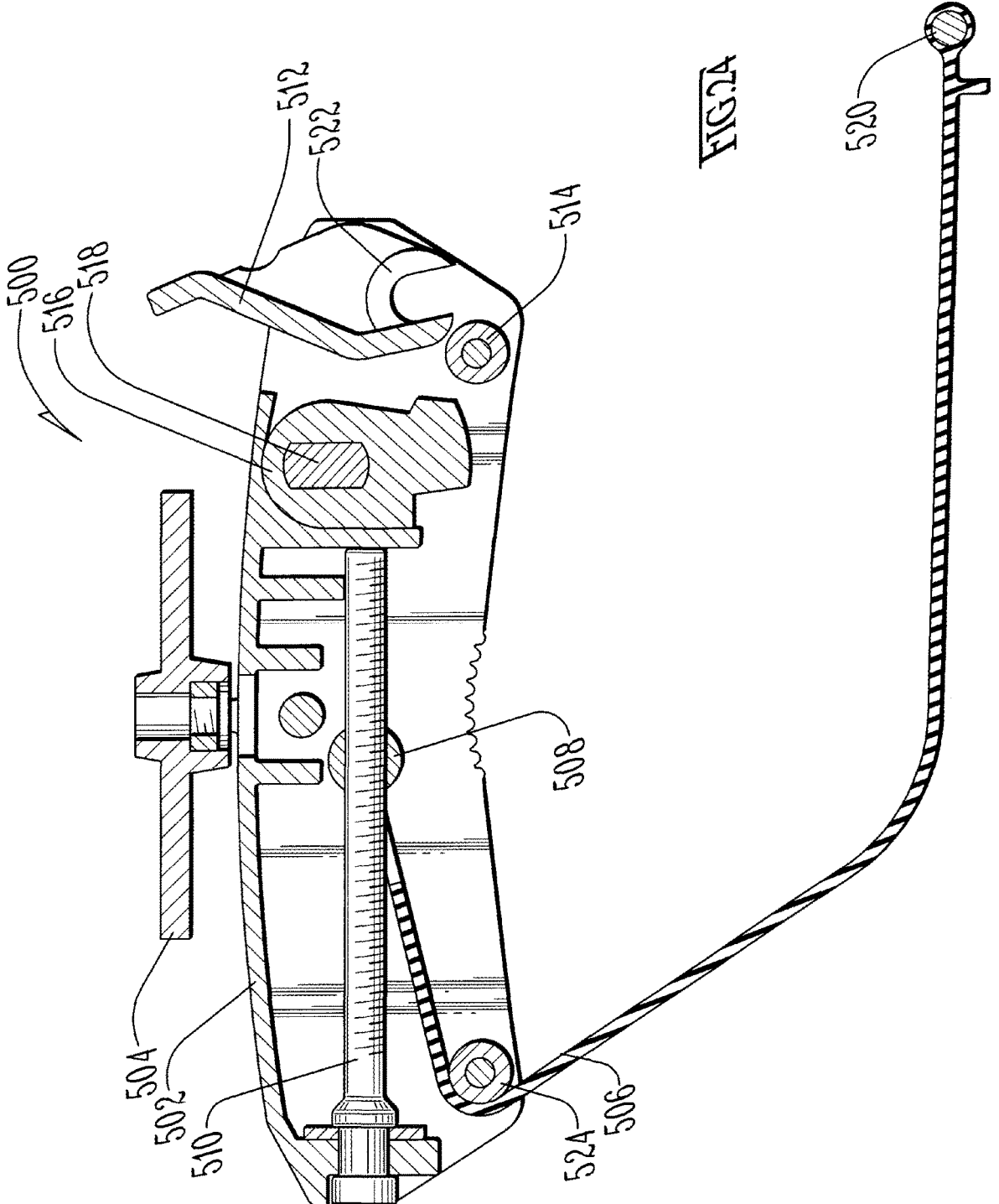
FIG. 24 is a cross-sectional view of an embodiment of the mount assembly in an open configuration.
Figure 25:
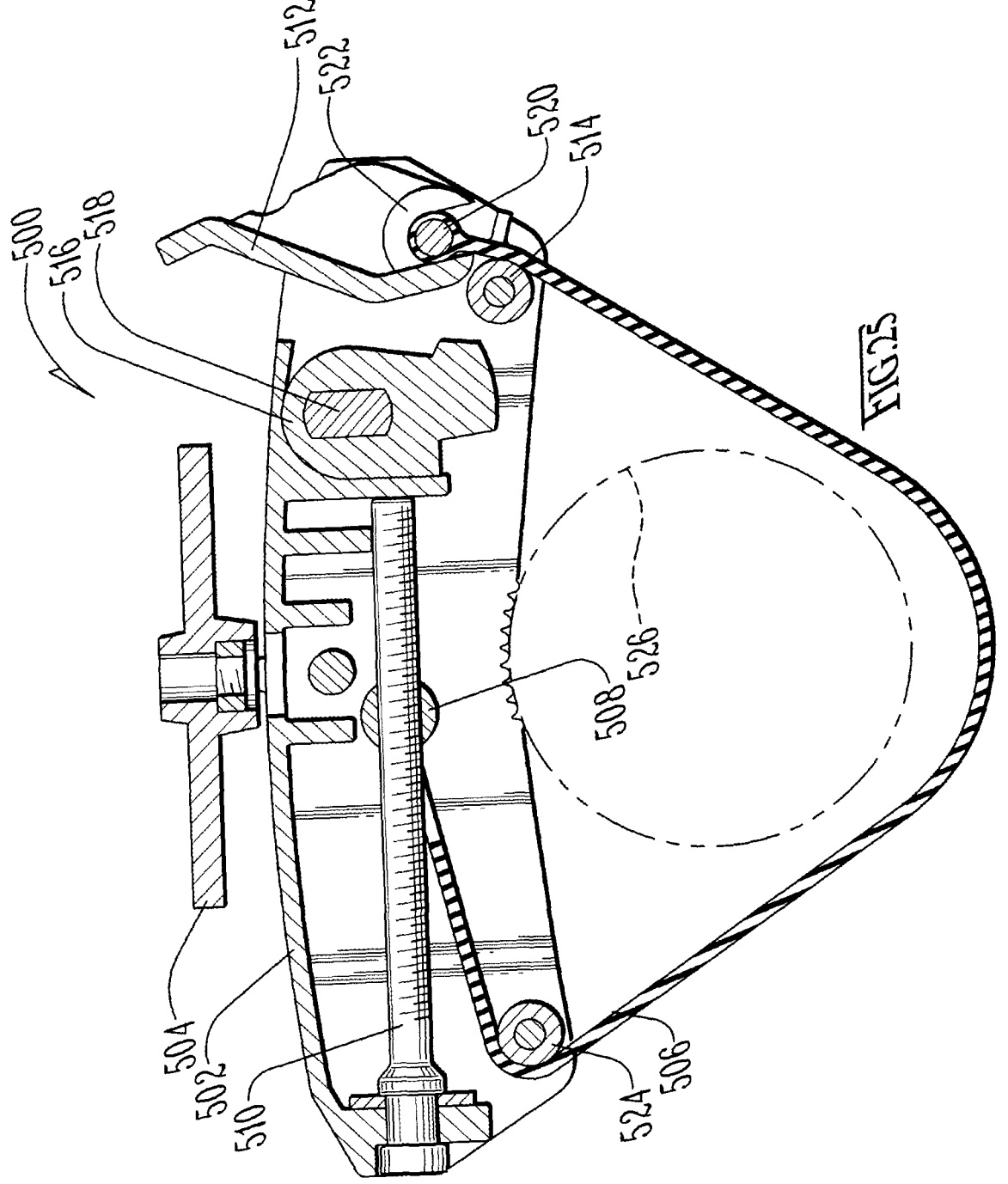
FIG. 25 is a cross-sectional view of an embodiment of the mount assembly in a partially closed configuration.
Figure 26:
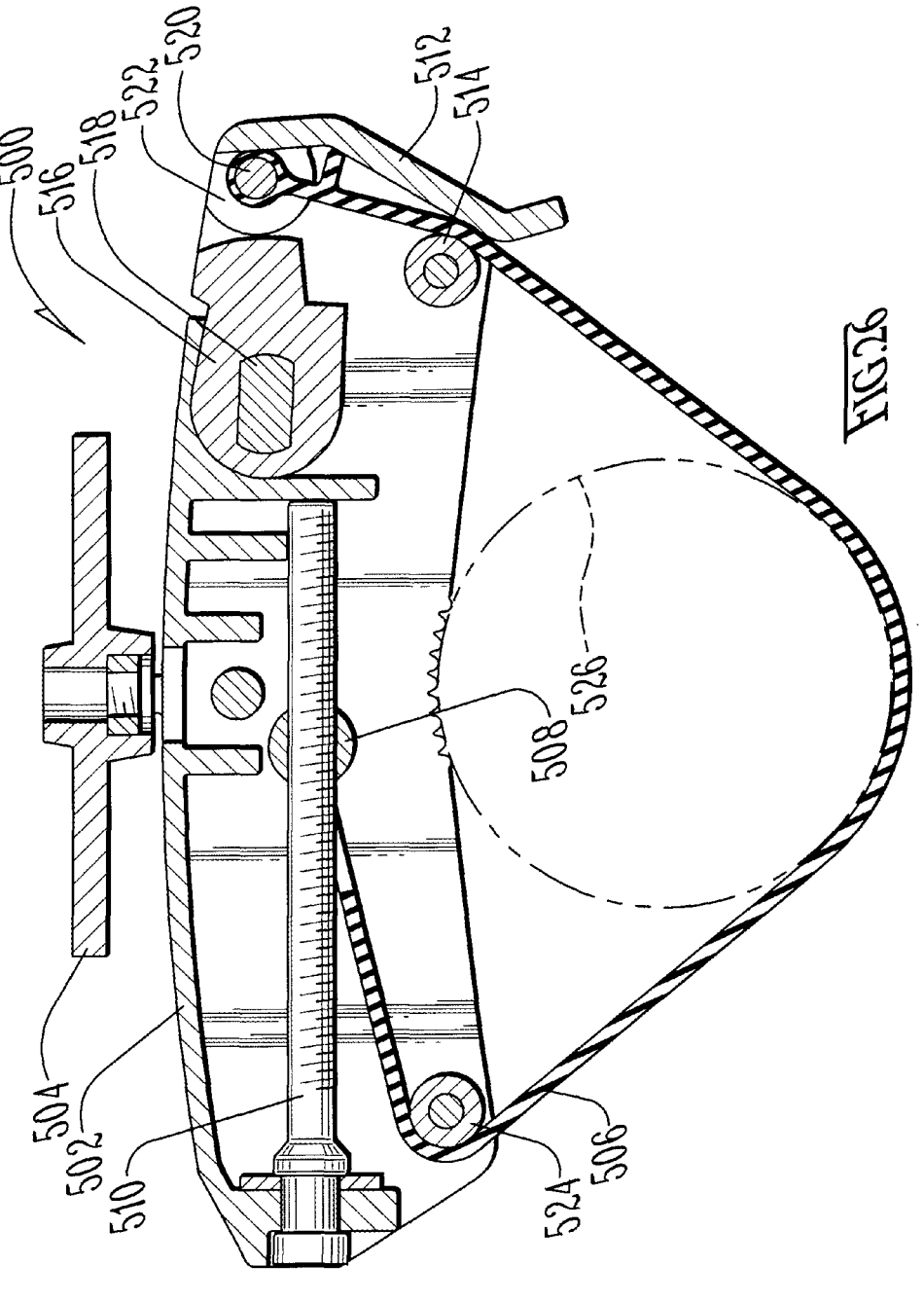
FIG. 26 is a cross-sectional view of an embodiment of the mount assembly in a closed and locked configuration.

FIG. 23 depicts the equipment rack 100 with two mount assemblies 500 attached to the lower rack assembly 102. The mount assemblies 500 releasably attach the rack 100 to a roof rack on the vehicle.

Referring now to FIGS. 24-28, cross-sectional views of a mount assembly 500 are depicted. The mount assembly comprises a mount body 502 which provides a structural element to which the other components of mount assembly 500 are attached. It may be formed from metal, plastic, or some other suitable material. An attachment bracket 504 may be provided for attaching the mount assembly 500 to the rack 100. It may be provided with bolt holes, threaded receptacles, or other means of releasably attaching to the rack 100. A flexible strap 506 is provided to wrap around an element of the vehicle roof rack to secure the mount assembly 500 to the vehicle. A first end of strap 506 is attached to a nut 508 that is disposed on lead screw 510. The lead screw 510 allows adjustment of the location and tension of strap 506.

A latch 512 is pivotally attached to the mount body 502. It is shown in an unlatched position in FIGS. 24-25, and in a latched position in FIGS. 26-28. In some embodiments a lock mechanism is provided to secure the latch 512 in a closed position. The depicted embodiment includes a cam 516 and lock cylinder 518 to secure the latch 112 in the closed position.

The strap 506 runs around the outside of support post 524, and then around the vehicle member 526 to which it is to be attached, then around support post 514. A toggle 520 at the second end of strap 506 is received by socket 522 in latch 512. The strap 506 is received by a gap in the socket 522 and the ends of toggle 520 which extend to each side of the strap 506 are secured in receptacle 522. Latch 512 is then rotated from the open position shown in FIG. 25 to the closed position shown in FIG. 26. The rotation of handle 512 pulls toggle 520 upward thus putting tension on strap 506 and pulling mount body 502 securing against vehicle member 526.

Figure 27:
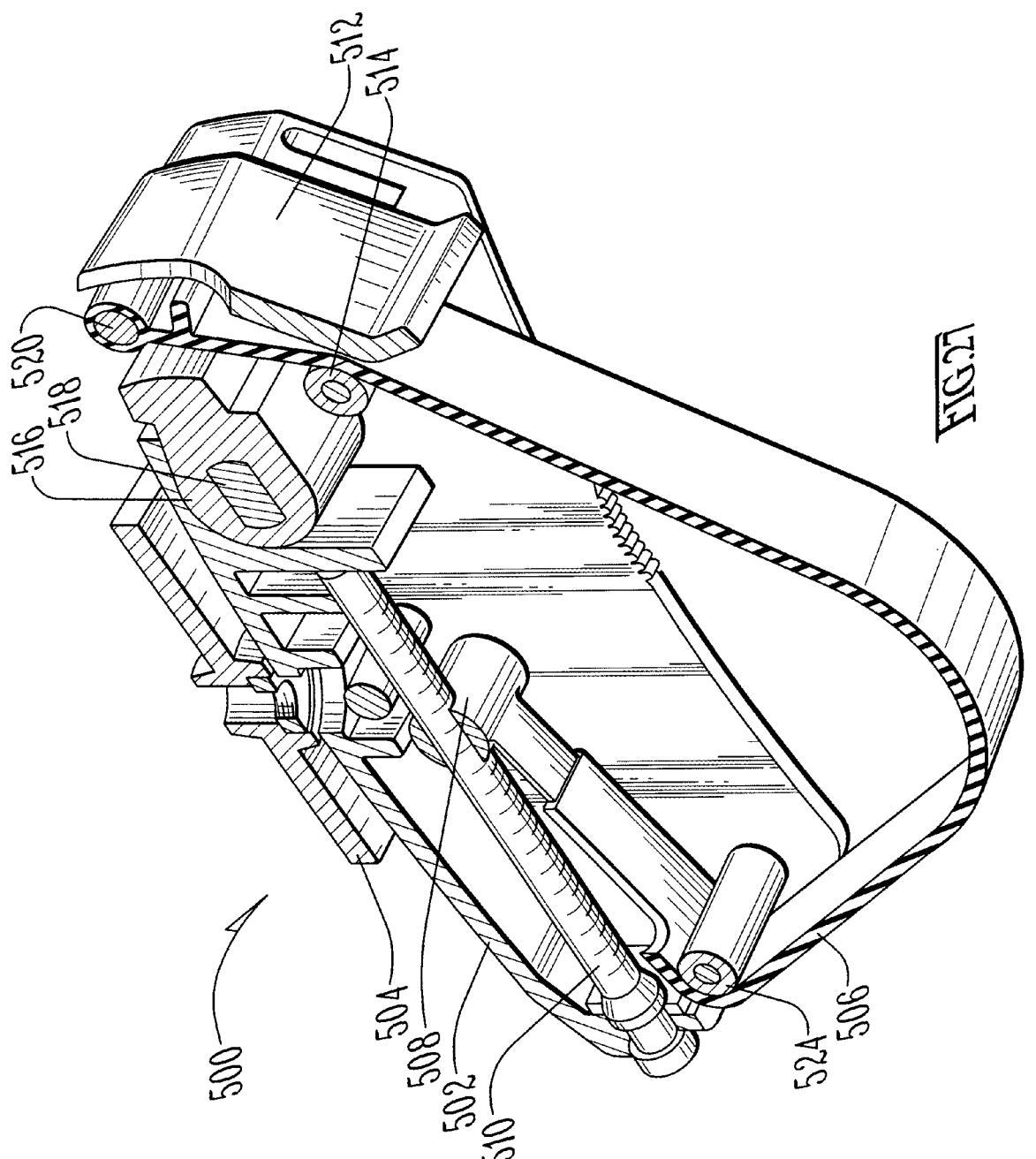
FIG. 27 is a perspective cross-sectional view of an embodiment of the mount assembly in a closed and latched configuration.
Figure 28:
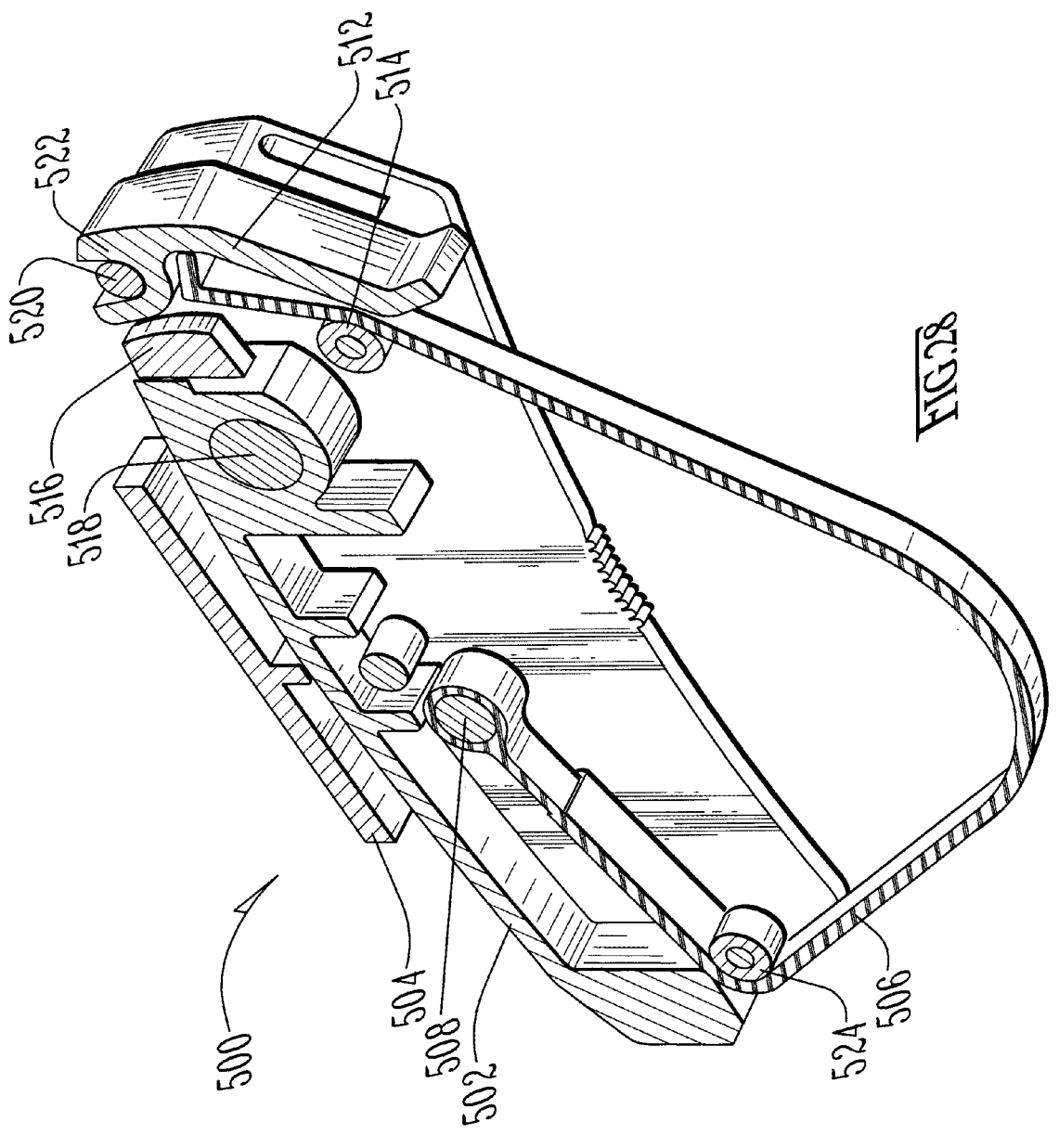
FIG. 28 is a perspective cross-sectional view of an embodiment of the mount assembly in a closed and latched configuration.
Figure 29:
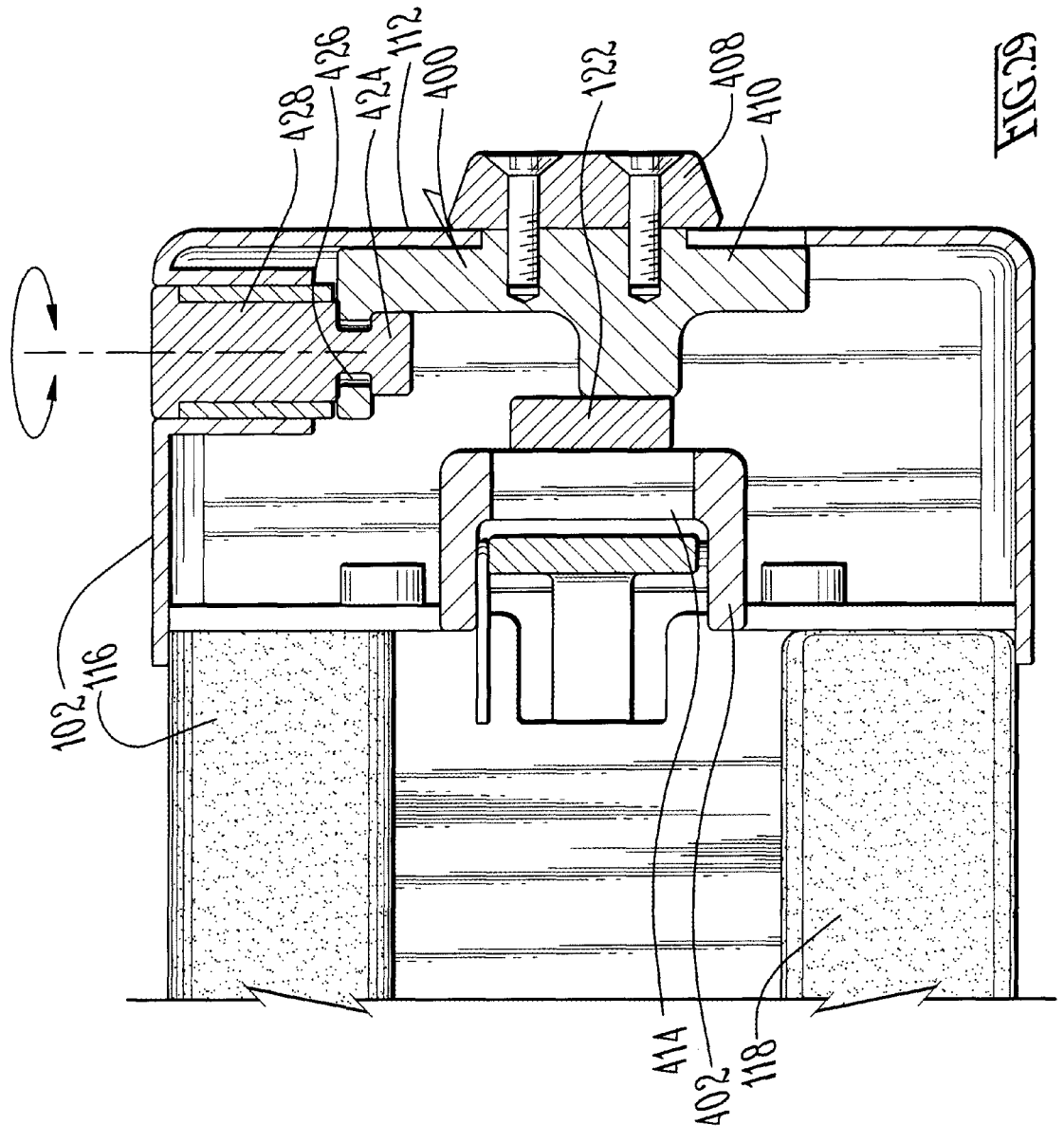
FIG. 29 is a cross-sectional view of the latch portion of an embodiment of the equipment rack.

FIGS. 27 and 28 depict cross-sectional views from a perspective to provide more detail on different cross-sections through the mount assembly 500. FIG. 27 depicts a cross-section that is substantially along the center axis of the mount assembly 500, while FIG. 28 depicts a cross-section that is between the center axis and one side of mount assembly 500.

Support posts 524 and 514 may be provided with bearings or bushings to reduce friction between the posts and the strap 506.

Referring now to FIGS. 30-35, another embodiment of the equipment rack is depicted in various views. In this additional embodiment, the lower support member 114 and the upper support member 116 do not extend the length of the lower and upper rack assemblies 102 and 104 or the cross members therein, but instead comprise protrusions, or teeth, extending upwardly and downwardly, respectively, from the lower and upper rack assemblies, namely from the cross members. In some embodiments the protrusions on the upper support member interlock with the protrusions on the lower support member along the longitudinal axis of the rack assemblies. In some embodiments, the protrusions may be provided in one or more rows on each of the upper and lower support members. In some embodiments the rows of protrusions may be longitudinally offset so that the protrusions interlock or overlap transversely as well as longitudinally.

The protrusions may be individually attached to the rack assemblies or may be attached to, or formed unitarily with, a sheet or membrane of material that is attached to the rack assemblies or to the cross member portion of the rack assembly. The sheet may be made of the same material as the protrusions, or from different materials. The protrusions may be made from the same materials as the support members in other embodiments of the equipment rack, capable of providing a flexible but supportive element such as a rubber material to conform to and support equipment without damaging it. Such materials will support equipment such as skis or snowboards stored in the rack without damaging the surface of the equipment.

When viewed from above or below, the protrusions may have a rectangular, square, circular, oval, or any other desired cross-section. The dimensions, shape, and size of the cross-section of the protrusions may increase, decrease, rotate, or otherwise vary from the bottom to the top of each protrusion. In varying embodiments, each of the upper and lower protrusions may have a three-dimensional shape selected from the group consisting of frusto-pyramidal, cubical, cuboid, parallelepiped, frusto-conical, hemispherical, conical, polyhedron, or a combination of the foregoing shapes. The protrusions may also be selected from The protrusions on each assembly may vary in shape, size, or orientation, and they may be disposed in rows, but may also be disposed in any desired configuration on the sheets that support them. Each of the protrusions may be formed of a solid block of one or more materials, may be closed on all sides and hollow in the middle, or may be all or partially hollow, open on the sides or ends, or comprise internal support members or membranes.

Figure 30:
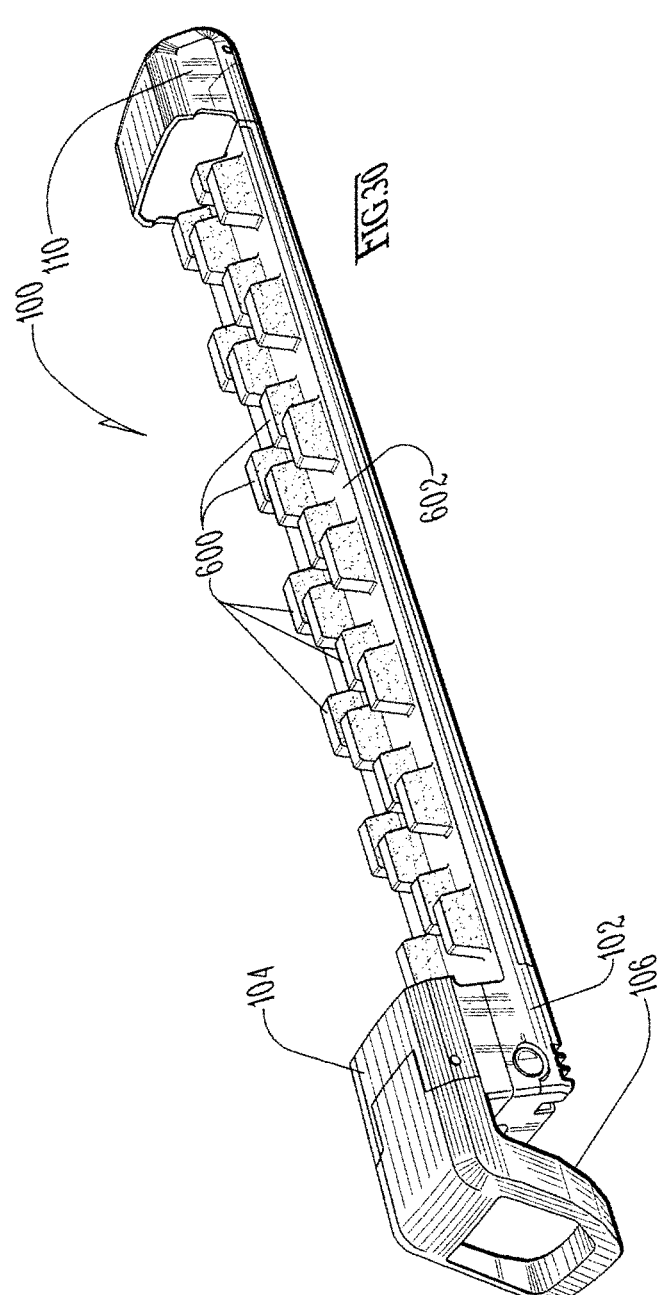
FIG. 30 is a top perspective view of an embodiment of the equipment rack.
Figure 31:
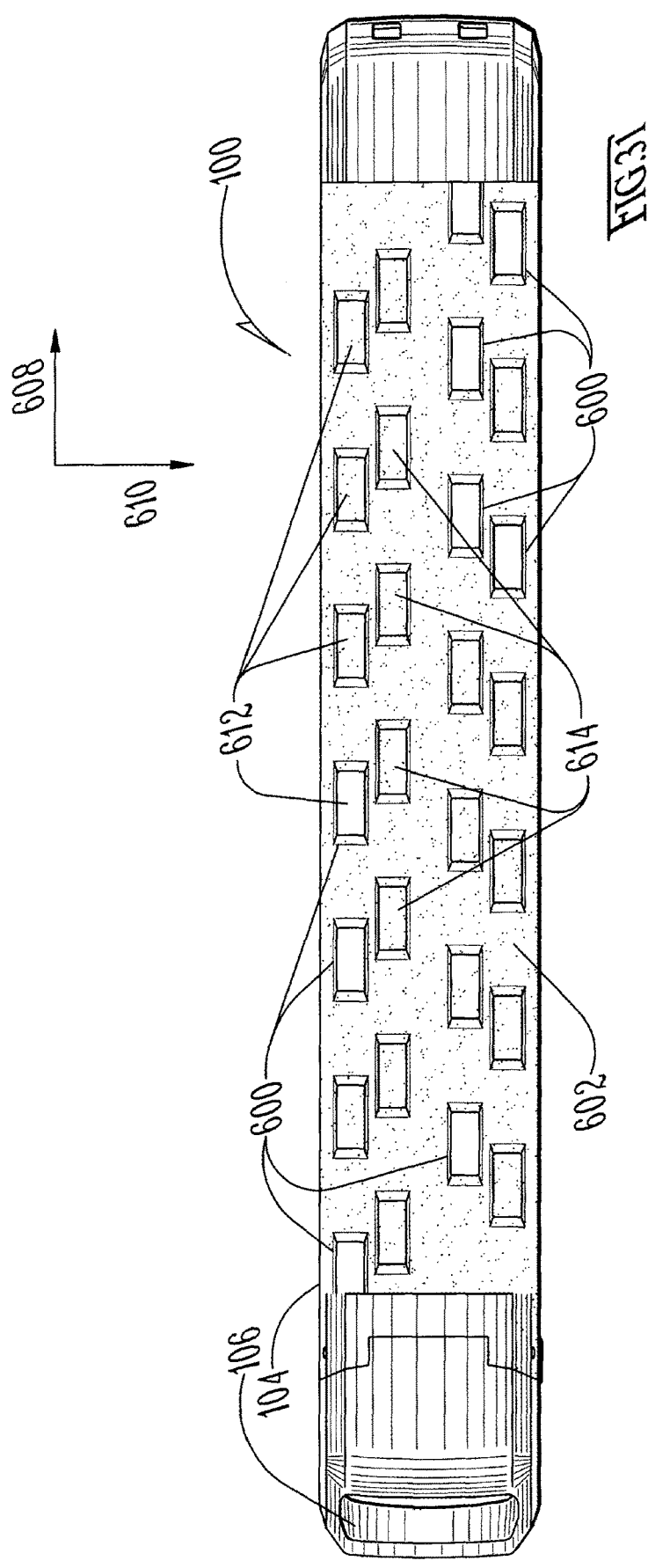
FIG. 31 is top view of an lower rack assembly of an embodiment of the equipment rack

Referring now to FIGS. 30 and 31, views of an embodiment of the equipment rack are shown with the upper rack assembly 104 partially removed to allow the lower rack assembly to be more easily depicted. In these embodiments, lower rack assembly 102 includes a plurality of protrusions 600 extending upwardly from the lower rack assembly 102. In the depicted embodiment, the protrusions 600 are attached to a support membrane 602 that is affixed to the lower rack assembly 102 by a variety of methods of fixation that are used for such applications.

In varying embodiments, the lower protrusions may be longitudinally offset in direction 608 from other protrusions.

In the same and other embodiments, the protrusions may also be transversely offset in direction 610 from other protrusions. In the embodiment depicted in FIG. 31, each protrusion in the first group of protrusions 612 are longitudinally offset from the other protrusions in that group 612. Similarly, each protrusion in the second group of protrusions 614 are longitudinally offset from the other protrusions in that group. Also, the protrusions in group 614 are each transversely offset from the protrusions in group 612, and simultaneously, the protrusions in group 614 are partially longitudinally offset from the protrusions in group 612, creating a partial longitudinal overlap. In varying embodiments the protrusions are offset from each other by varying longitudinal and transverse offsets to create a desired pattern and support characteristics.

Figure 32:
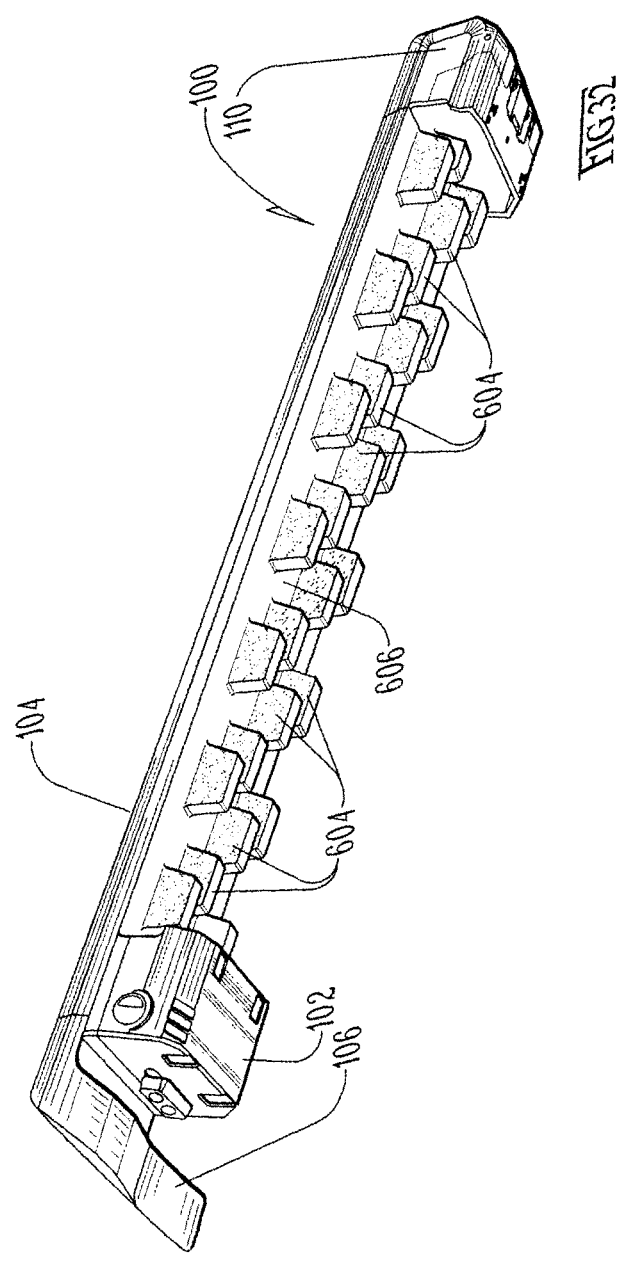
FIG. 32 is a bottom perspective view of an embodiment of the equipment rack.
Figure 33:
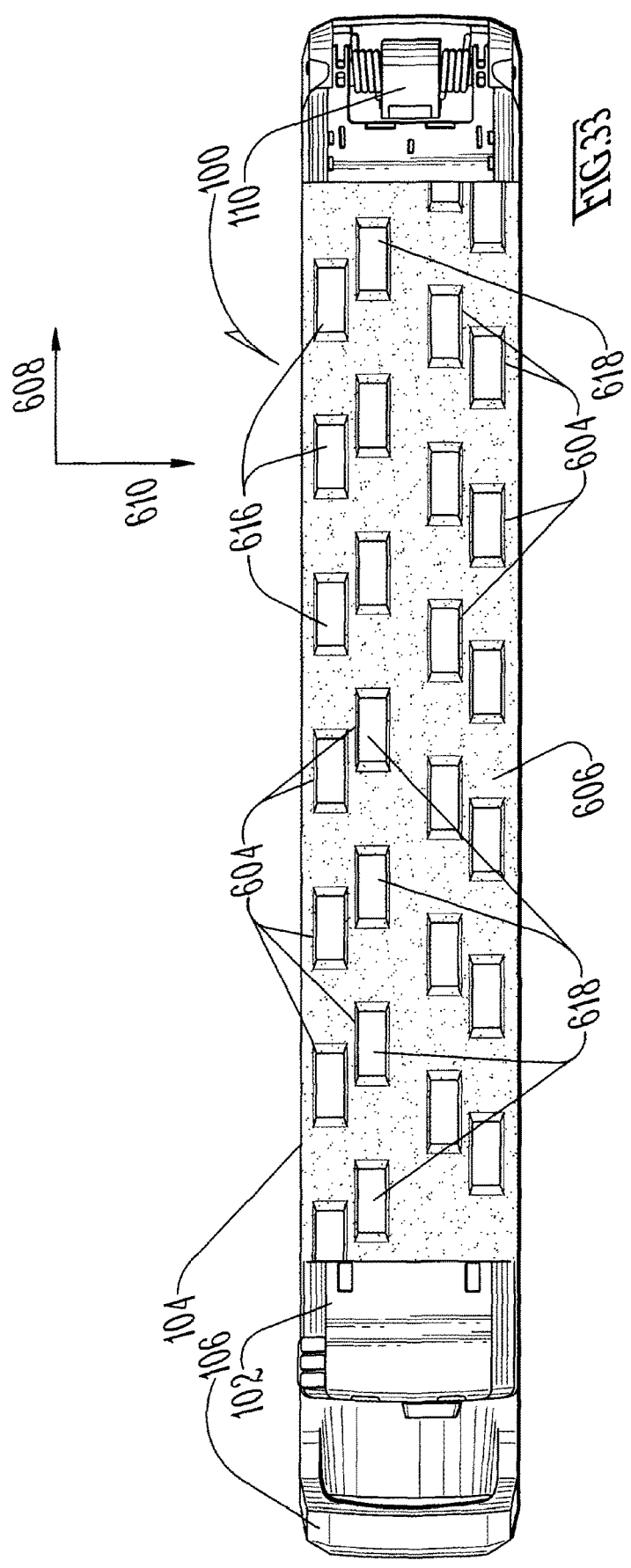
FIG. 33 is a bottom view of an upper rack assembly of an embodiment of the equipment rack.

Referring now to FIGS. 32 and 33, views of an embodiment of the equipment rack are shown with the lower rack assembly 102 removed to allow the upper rack assembly 104 to be more easily depicted. In these embodiments, upper rack assembly 104 includes a plurality of protrusions 604 extending downwardly from the upper rack assembly 104. In the depicted embodiment, the protrusions 604 are attached to a support membrane 606 that is affixed to the upper rack assembly 104 by a variety of methods of fixation that are used for such applications.

In varying embodiments of the upper protrusions, they may be longitudinally offset, transversely offset, or a combination of such offsets, from other upper protrusions, in the same manner as the lower protrusions, the upper protrusions may be described in groups such as first group 616 with longitudinally offset protrusions, and second group 618 with longitudinally offset protrusions, where the protrusions in the second group 618 are partially offset from corresponding protrusions in first group 616.

In some embodiments, the upper and lower protrusions are arranged so that when the rack is in the closed, collapsed configuration with no equipment on the rack, the protrusions interlock to allow the upper and lower rack assemblies to be closer together than when equipment is secured in the rack. This collapsed configuration provides better aerodynamic and visual characteristics than other more separated configurations of the upper and lower rack assemblies.

In some embodiments, in the collapsed configuration the protrusions interlock such that there are substantially no gaps for airflow between the upper and lower cross members of the upper and lower rack assemblies. In the depicted embodiment, the positioning of group 612 and 616 in the collapsed configuration occupy a plane that intersects the upper and lower cross members, and the protrusions engage to substantially prevent air flow through that plane, though small gaps may be present for purposes of fit and function of the device. In some embodiments selected air channels or gaps may be left to allow desired airflow without departing from the scope of this invention.

Although the depicted embodiments of the rack include an expandable hinge assembly, such an assembly is not required for the operation of the inventive device. No hinge is necessary at all in some embodiments. For example, one or both ends of the cross members may be provided with a vertically sliding attachment to allow the upper and lower cross members to be moved from a closed, collapsed configuration to an open configuration. In another embodiment, both ends of the cross members could be attached with latches that allowed the upper rack assembly to be completely removed from the lower rack assembly. The inventive device claimed herein requires that the two cross members be adjustably attached at least at one end so that the two cross members may be moved from the open configuration to the collapsed and expanded configurations.

Other patterns and groupings of upper and lower protrusions will be clear to one of skill in the art. Such patterns may include combinations of longitudinal and transverse offsets to provide a closed, collapsed configuration that provides the desired aerodynamic characteristics, while also providing sufficient support and holding force on equipment stored in the rack in the closed, expanded configuration.

Figure 34:
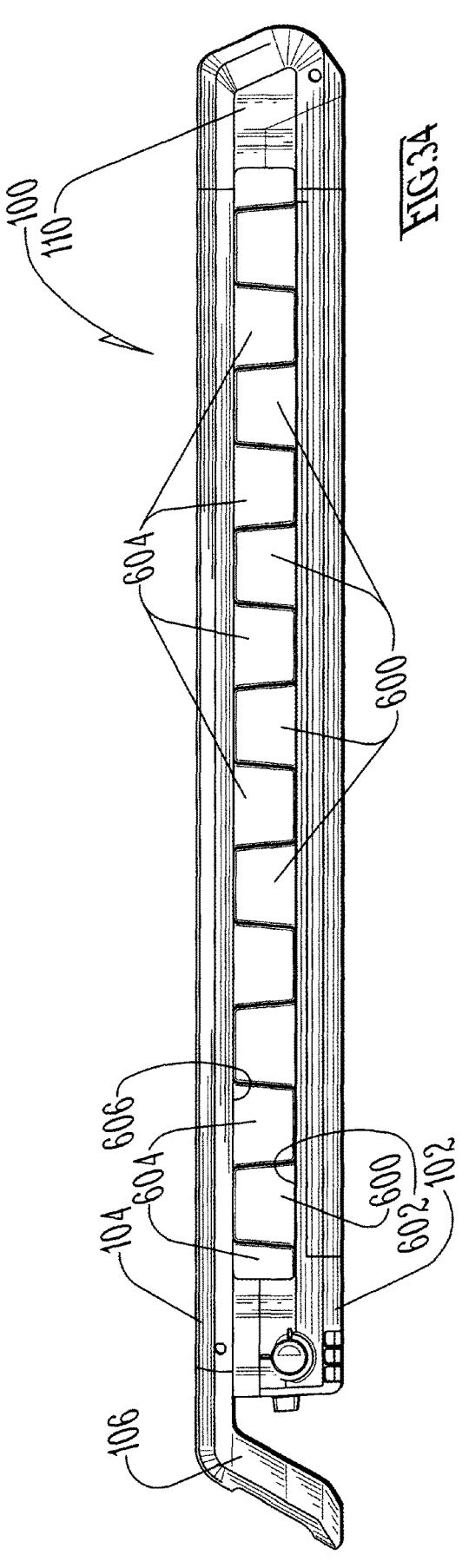
FIG. 34 is a side view of an embodiment of the equipment rack.
Figure 35:
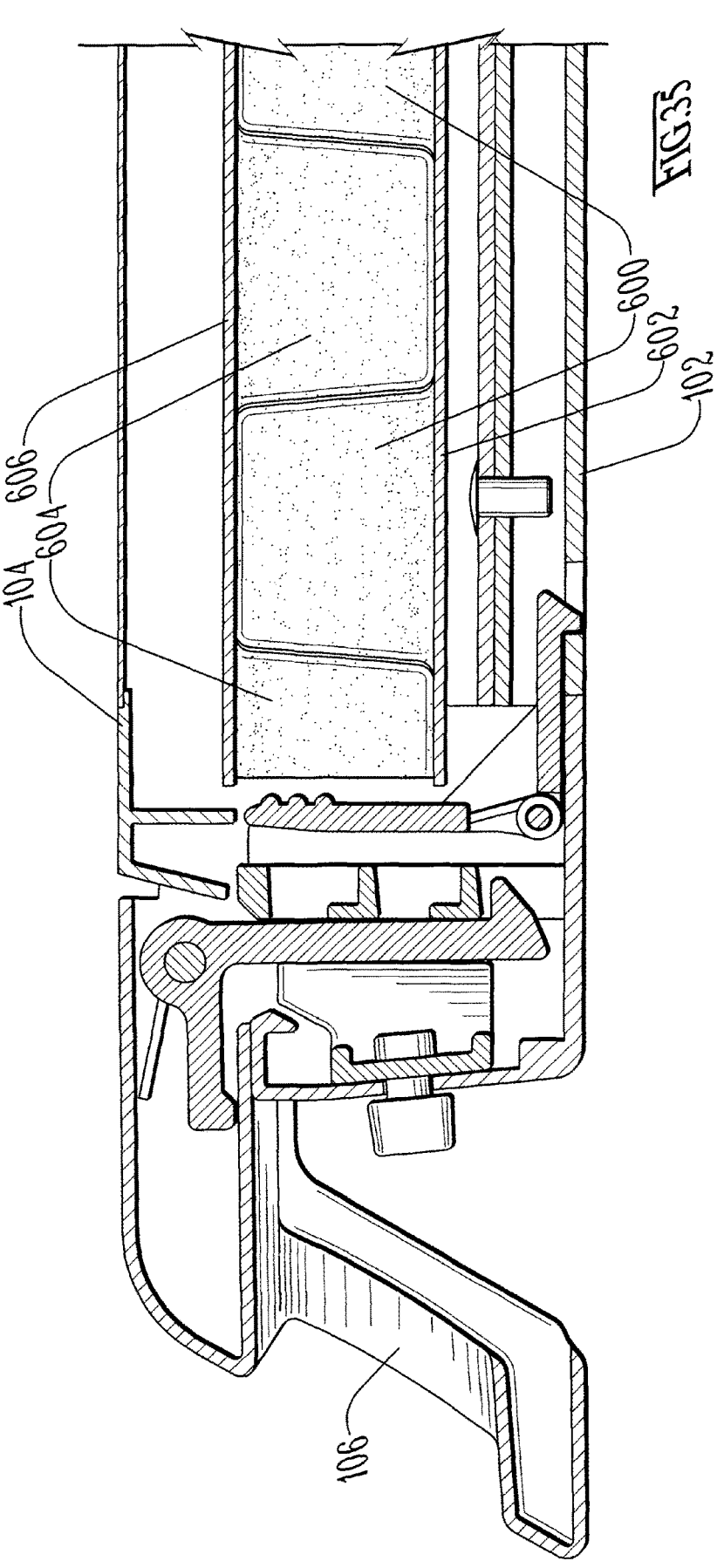
FIG. 35 is a cross-sectional view of a portion of an embodiment of the equipment rack.

Referring now to FIGS. 34 and 35, side and cross-sectional views of an embodiment of the equipment rack are depicted in a collapsed configuration. In the depicted embodiment, in the collapsed configuration the protrusions 600 and 604 interlock with each other. In some embodiments of this configuration, the top surfaces of each protrusion 600 or 604 may directly contact the opposing rack assembly or the membrane 406 or 602, respectively. In other embodiments a gap may remain between the top surface of each protrusion and the opposing rack assembly or membrane, even in the closed, collapsed configuration. In the depicted embodiment, the side walls of protrusions 600 and 604 may directly contact the sidewalls of the adjacent protrusions, or a gap may be left between the sidewalls in the closed, collapsed configuration. Even if such gaps are present in the closed, collapsed configuration, the protrusions may still be said to interlock if longitudinal or transverse offset is used to allow the closed, collapsed configuration to reduce the distance between the upper and lower rack assemblies as compared to the expanded configuration when equipment is secured on the rack.

In the depicted embodiment, the sidewalls of the protrusions 600 and 604 are disposed at an angle, or taper as the protrusions extend away from the rack assembly to which they are attached. In other words the depicted protrusions are substantially frusto-pyramidal. In other embodiments they may be of other shapes, such as frusto-conical, cubic, cuboid, polyhedron, or similar shapes, for example.

The embodiment depicted in FIGS. 30-35 are provided with an expandable hinge assembly 110 and a handle assembly 106 as other embodiments. In an expanded configuration, the embodiment depicted in these figures closes on the skis, snowboards, or other equipment held in the rack so that the top surfaces of the protrusions 600 and 604 contact the equipment from opposing sides to hold the equipment in place.

The interlocking protrusions provide improved clamping performance when items of different thicknesses are secured in the rack. For example, if a pair of skis and a snow board are simultaneously secured in the rack, the interlocking protrusions accommodate the different items in closer proximity while maintaining a secure clamping force on both items. The gaps between the protrusions and the longitudinally-offset arrangement of the protrusions more readily adjust to such different thicknesses than does the continuous longitudinal support member of other embodiments of the rack.

When referring to the position of the upper and lower rack assemblies (or components thereof), the term "open configuration" is used to refer to a position in which the rack is capable of having equipment placed onto it for storage or transport. When referring to the position of the upper and lower rack assemblies (or components thereof), the terms "collapsed configuration" or "closed, collapsed configuration" refer to a configuration of the rack with the upper and lower rack assemblies in a position that is closer together than when equipment is secured in the rack. When referring to the position of the upper and lower rack assemblies (or components thereof), the terms "expanded configuration" or "closed, expanded configuration" refer to a configuration of the rack with the upper and lower rack assemblies in a closed position but separated sufficiently to allow equipment to be secured between the two assemblies on the rack.

Referring now to FIG. 36, a side view of an embodiment of the rack is depicted in a closed, expanded configuration. A snowboard or skis are shown secured in the rack in cross-section. The protrusions grip the equipment from above and below and may apply sufficient force to the equipment to hold it in place on the rack.

"Substantially" or "about" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A rack for carrying ski equipment on a vehicle, the rack comprising:

a base member configured to attach to a vehicle;

a clamp member pivotally attached to the base member and configured to pivot from a closed configuration to an open configuration;

a first plurality of spaced-apart protrusions extending from the base member and the clamp member, each spaced-apart protrusion in the first plurality of spaced-apart protrusions disposed at least partially along a first longitudinal plane of the rack;

a second plurality of spaced-apart protrusions extending from the base member and the clamp member, each spaced-apart protrusion in the second plurality of spaced-apart protrusions disposed at least partially along a second longitudinal plane of the rack;

a third plurality of spaced-apart protrusions extending from the base member and the clamp member, each spaced-apart protrusion in the third plurality of spaced-apart protrusions disposed at least partially along a third longitudinal plane of the rack;

a fourth plurality of spaced-apart protrusions extending from the base member and the clamp member, each spaced-apart protrusion in the fourth plurality of spaced-apart protrusions disposed at least partially along a fourth longitudinal plane of the rack;

wherein in the closed configuration the spaced-apart protrusions in the first plurality of spaced-apart protrusions interlock along the first longitudinal plane of the rack to fill the first longitudinal plane of the rack between the base member and the clamp member;

wherein in the closed configuration the spaced-apart protrusions in the second plurality of spaced-apart protrusions interlock along the second longitudinal plane of the rack to fill the second longitudinal plane of the rack between the base member and the clamp member;

wherein the first plurality of spaced-apart protrusions is longitudinally offset from the second plurality of spaced-apart protrusions so that at least one transverse plane across the base member intersects a space between spaced-apart protrusions on the base member in the first plurality and also intersects a protrusion on the base member in the second plurality;

wherein the first plurality of spaced-apart protrusions, the second plurality of spaced-apart protrusions, the third plurality of spaced-apart protrusions, and the fourth plurality of spaced-apart protrusions are longitudinally offset from each other so that each transverse plane through the base member intersects at least one protrusion in the pluralities.

* * * * *